(12) United States Patent
Marks et al.

(10) Patent No.: US 8,758,132 B2
(45) Date of Patent: *Jun. 24, 2014

(54) METHODS AND SYSTEMS FOR ENABLING DEPTH AND DIRECTION DETECTION WHEN INTERFACING WITH A COMPUTER PROGRAM

(75) Inventors: Richard L. Marks, Foster City, CA (US); Hrishikesh R. Deshpande, Foster City, CA (US)

(73) Assignee: Sony Computer Entertainment Inc., Tokyo (JP)

( * ) Notice: Subject to any disclaimer, the term of this patent is extended or adjusted under 35 U.S.C. 154(b) by 17 days.

This patent is subject to a terminal disclaimer.

(21) Appl. No.: 13/595,908

(22) Filed: Aug. 27, 2012

(65) Prior Publication Data

US 2012/0319950 A1 Dec. 20, 2012

Related U.S. Application Data

(63) Continuation of application No. 13/169,440, filed on Jun. 27, 2011, now Pat. No. 8,251,820, which is a continuation of application No. 12/903,140, filed on Oct. 12, 2010, now Pat. No. 8,303,411, which is a continuation of application No. 11/302,511, filed on Dec. 12, 2005, now Pat. No. 7,874,917, which is a continuation-in-part of application No. 10/663,236, filed on Sep. 15, 2003, now Pat. No. 7,883,415, and a continuation-in-part of application No. 10/759,782, filed on Jan. 16, 2004, now Pat. No. 7,623,115.

(51) Int. Cl.
*G06F 17/00* (2006.01)

(52) U.S. Cl.
USPC .......................................................... 463/36

(58) Field of Classification Search
USPC ........................ 463/2–6, 31, 36, 37; 345/156; 348/169–172; 382/313
See application file for complete search history.

(56) References Cited

U.S. PATENT DOCUMENTS

| 3,943,277 A | 3/1976 | Everly et al. |
| 4,263,504 A | 4/1981 | Thomas |

(Continued)

FOREIGN PATENT DOCUMENTS

| EP | 0353200 A | 1/1990 |
| EP | 0613294 A | 8/1994 |

(Continued)

OTHER PUBLICATIONS

"European Search Report" for European Application No. 07251651.1 dated Oct. 18, 2007.

(Continued)

*Primary Examiner* — Ronald Laneau
(74) *Attorney, Agent, or Firm* — Joshua D. Isenberg; JDI Patent

(57) ABSTRACT

One or more images can be captured with a depth camera having a capture location in a coordinate space. First and second objects in the one or more images can be identified and assigned corresponding first and second object locations in the coordinate space. A relative position can be identified in the coordinate space between the first object location and the second object location when viewed from the capture location by computing an azimuth angle and an altitude angle between the first object location and the object location in relation to the capture location. The relative position includes a dimension of depth with respect to the coordinate space. The dimension of depth is determined from analysis of the one or more images. A state of a computer program is changed based on the relative position.

13 Claims, 13 Drawing Sheets

(56) References Cited

U.S. PATENT DOCUMENTS

| | | |
|---|---|---|
| 4,313,227 A | 1/1982 | Eder |
| 4,558,864 A | 12/1985 | Medwedeff |
| 4,565,999 A | 1/1986 | King et al. |
| 4,802,227 A | 1/1989 | Elko et al. |
| 4,823,001 A | 4/1989 | Kobayashi et al. |
| 4,843,568 A | 6/1989 | Krueger et al. |
| 4,963,858 A | 10/1990 | Chien |
| 5,034,986 A | 7/1991 | Karmann et al. |
| 5,055,840 A | 10/1991 | Bartlett |
| 5,111,401 A | 5/1992 | Everett et al. |
| 5,144,594 A | 9/1992 | Gilchrist |
| 5,260,556 A | 11/1993 | Lake et al. |
| 5,297,061 A | 3/1994 | Dementhon et al. |
| 5,335,011 A | 8/1994 | Addeo et al. |
| 5,394,168 A | 2/1995 | Smith, III et al. |
| 5,426,450 A | 6/1995 | Drumm |
| 5,453,758 A | 9/1995 | Sato |
| 5,455,685 A | 10/1995 | Mori |
| 5,485,273 A | 1/1996 | Mark et al. |
| 5,517,333 A | 5/1996 | Tamura et al. |
| 5,534,917 A | 7/1996 | MacDougall |
| 5,543,818 A | 8/1996 | Scott |
| 5,554,980 A | 9/1996 | Hashimoto et al. |
| 5,557,684 A | 9/1996 | Wang et al. |
| 5,563,988 A | 10/1996 | Maes et al. |
| 5,568,928 A | 10/1996 | Munson et al. |
| 5,581,276 A | 12/1996 | Cipolla et al. |
| 5,583,478 A | 12/1996 | Renzi |
| 5,586,231 A | 12/1996 | Florent et al. |
| 5,608,221 A | 3/1997 | Bertelsen et al. |
| 5,611,000 A | 3/1997 | Szeliski et al. |
| 5,611,731 A | 3/1997 | Bouton et al. |
| 5,616,078 A | 4/1997 | Oh |
| 5,638,228 A | 6/1997 | Thomas, III |
| 5,649,021 A | 7/1997 | Matey et al. |
| 5,675,828 A | 10/1997 | Stoel et al. |
| 5,677,710 A | 10/1997 | Thompson-Rohrlich |
| 5,706,364 A | 1/1998 | Kopec et al. |
| 5,768,415 A | 6/1998 | Jagadish et al. |
| 5,796,354 A | 8/1998 | Cartabiano et al. |
| 5,818,424 A | 10/1998 | Korth |
| 5,846,086 A | 12/1998 | Bizzi et al. |
| 5,850,222 A | 12/1998 | Cone |
| 5,850,473 A | 12/1998 | Andersson |
| 5,861,910 A | 1/1999 | McGarry et al. |
| 5,870,100 A | 2/1999 | DeFreitas |
| 5,883,616 A | 3/1999 | Koizumi et al. |
| 5,889,672 A | 3/1999 | Schuler et al. |
| 5,900,863 A | 5/1999 | Numazaki |
| 5,913,727 A | 6/1999 | Ahdoot |
| 5,914,723 A | 6/1999 | Gajewska |
| 5,917,493 A | 6/1999 | Tan et al. |
| 5,917,936 A | 6/1999 | Katto |
| 5,923,318 A | 7/1999 | Zhai et al. |
| 5,929,444 A | 7/1999 | Leichner et al. |
| 5,930,383 A | 7/1999 | Netzer |
| 5,930,741 A | 7/1999 | Kramer |
| 5,937,081 A | 8/1999 | O'Brill et al. |
| 5,959,596 A | 9/1999 | McCarten et al. |
| 5,963,250 A | 10/1999 | Parker et al. |
| 5,993,314 A | 11/1999 | Dannenberg et al. |
| 6,009,210 A | 12/1999 | Kang |
| 6,014,167 A | 1/2000 | Suito et al. |
| 6,021,219 A | 2/2000 | Andersson et al. |
| 6,022,274 A | 2/2000 | Takeda et al. |
| 6,031,545 A | 2/2000 | Ellenby et al. |
| 6,031,934 A | 2/2000 | Ahmad et al. |
| 6,037,942 A | 3/2000 | Millington |
| 6,044,181 A | 3/2000 | Szeliski et al. |
| 6,049,619 A | 4/2000 | Anandan et al. |
| 6,056,640 A | 5/2000 | Schaaij |
| 6,057,909 A | 5/2000 | Yahav et al. |
| 6,061,055 A | 5/2000 | Marks |
| 6,072,494 A | 6/2000 | Nguyen |
| 6,075,895 A | 6/2000 | Qiao et al. |
| 6,091,905 A | 7/2000 | Yahav et al. |
| 6,094,625 A | 7/2000 | Ralston |
| 6,097,369 A | 8/2000 | Wambach |
| 6,100,517 A | 8/2000 | Yahav et al. |
| 6,101,289 A | 8/2000 | Kellner |
| 6,115,052 A | 9/2000 | Freeman et al. |
| 6,134,346 A | 10/2000 | Berman et al. |
| 6,151,009 A | 11/2000 | Kanade et al. |
| 6,160,540 A | 12/2000 | Fishkin et al. |
| 6,166,744 A | 12/2000 | Jaszlics et al. |
| 6,173,059 B1 | 1/2001 | Huang et al. |
| 6,175,343 B1 | 1/2001 | Mitchell et al. |
| 6,184,863 B1 | 2/2001 | Sibert et al. |
| 6,191,773 B1 | 2/2001 | Maruno et al. |
| 6,195,104 B1 | 2/2001 | Lyons |
| 6,215,898 B1 | 4/2001 | Woodfill et al. |
| 6,243,054 B1 | 6/2001 | DeLuca et al. |
| 6,243,074 B1 | 6/2001 | Fishkin et al. |
| 6,243,491 B1 | 6/2001 | Andersson |
| 6,275,213 B1 | 8/2001 | Tremblay et al. |
| 6,281,930 B1 | 8/2001 | Parker et al. |
| 6,282,362 B1 | 8/2001 | Murphy et al. |
| 6,297,838 B1 | 10/2001 | Chang et al. |
| 6,307,549 B1 | 10/2001 | King et al. |
| 6,307,568 B1 | 10/2001 | Rom |
| 6,323,839 B1 | 11/2001 | Fukuda et al. |
| 6,323,942 B1 | 11/2001 | Bamji |
| 6,326,901 B1 | 12/2001 | Gonzales |
| 6,327,073 B1 | 12/2001 | Yahav et al. |
| 6,331,911 B1 | 12/2001 | Manassen et al. |
| 6,346,929 B1 | 2/2002 | Fukushima et al. |
| 6,351,661 B1 | 2/2002 | Cosman |
| 6,371,849 B1 | 4/2002 | Togami |
| 6,392,644 B1 | 5/2002 | Miyata et al. |
| 6,393,142 B1 | 5/2002 | Swain et al. |
| 6,394,897 B1 | 5/2002 | Togami |
| 6,400,374 B2 | 6/2002 | Lanier |
| 6,409,602 B1 | 6/2002 | Wiltshire et al. |
| 6,411,392 B1 | 6/2002 | Bender et al. |
| 6,411,744 B1 | 6/2002 | Edwards |
| 6,417,836 B1 | 7/2002 | Kumar et al. |
| 6,441,825 B1 | 8/2002 | Peters |
| 6,473,516 B1 | 10/2002 | Kawaguchi et al. |
| 6,504,535 B1 | 1/2003 | Edmark |
| 6,513,160 B2 | 1/2003 | Dureau |
| 6,516,466 B1 | 2/2003 | Jackson |
| 6,533,420 B1 | 3/2003 | Eichenlaub |
| 6,542,927 B2 | 4/2003 | Rhoads |
| 6,545,706 B1 | 4/2003 | Edwards et al. |
| 6,546,153 B1 | 4/2003 | Hoydal |
| 6,556,704 B1 | 4/2003 | Chen |
| 6,559,813 B1 | 5/2003 | DeLuca et al. |
| 6,577,748 B2 | 6/2003 | Chang |
| 6,580,414 B1 | 6/2003 | Wergen et al. |
| 6,580,415 B1 | 6/2003 | Kato et al. |
| 6,587,573 B1 | 7/2003 | Stam et al. |
| 6,593,956 B1 | 7/2003 | Potts et al. |
| 6,595,642 B2 | 7/2003 | Wirth |
| 6,621,938 B1 | 9/2003 | Tanaka et al. |
| 6,628,265 B2 | 9/2003 | Hwang |
| 6,661,914 B2 | 12/2003 | Dufour |
| 6,674,415 B2 | 1/2004 | Nakamura et al. |
| 6,676,522 B2 | 1/2004 | Rowe et al. |
| 6,677,967 B2 | 1/2004 | Sawano et al. |
| 6,677,987 B1 | 1/2004 | Girod |
| 6,709,108 B2 | 3/2004 | Levine et al. |
| 6,720,949 B1 | 4/2004 | Pryor et al. |
| 6,746,124 B2 | 6/2004 | Fischer et al. |
| 6,749,510 B2 | 6/2004 | Giobbi |
| 6,751,338 B1 | 6/2004 | Wallack |
| 6,753,849 B1 | 6/2004 | Curran et al. |
| 6,767,282 B2 | 7/2004 | Matsuyama et al. |
| 6,769,769 B2 | 8/2004 | Podoleanu et al. |
| 6,772,057 B2 | 8/2004 | Breed et al. |
| 6,774,939 B1 | 8/2004 | Peng |
| 6,785,329 B1 | 8/2004 | Pan et al. |
| 6,789,967 B1 | 9/2004 | Forester |
| 6,791,531 B1 | 9/2004 | Johnston et al. |
| 6,795,068 B1 | 9/2004 | Marks |

(56) References Cited

U.S. PATENT DOCUMENTS

| | | |
|---|---|---|
| 6,809,776 B1 | 10/2004 | Simpson et al. |
| 6,819,318 B1 | 11/2004 | Geng |
| 6,846,238 B2 | 1/2005 | Wells |
| 6,847,311 B2 | 1/2005 | Li |
| 6,881,147 B2 | 4/2005 | Naghi et al. |
| 6,884,171 B2 | 4/2005 | Eck et al. |
| 6,890,262 B2 | 5/2005 | Oishi et al. |
| 6,917,688 B2 | 7/2005 | Yu et al. |
| 6,919,824 B2 | 7/2005 | Lee |
| 6,924,787 B2 | 8/2005 | Kramer et al. |
| 6,930,725 B1 | 8/2005 | Hayashi |
| 6,931,125 B2 | 8/2005 | Smallwood |
| 6,931,596 B2 | 8/2005 | Gutta et al. |
| 6,943,776 B2 | 9/2005 | Ehrenburg |
| 6,945,653 B2 | 9/2005 | Kobori et al. |
| 6,947,576 B2 | 9/2005 | Stam et al. |
| 6,951,515 B2 | 10/2005 | Ohshima et al. |
| 6,952,198 B2 | 10/2005 | Hansen |
| 6,965,362 B1 | 11/2005 | Ishizuka |
| 6,970,183 B1 | 11/2005 | Monroe |
| 6,990,639 B2 | 1/2006 | Wilson |
| 7,006,009 B2 | 2/2006 | Newman |
| 7,016,411 B2 | 3/2006 | Azuma et al. |
| 7,039,199 B2 | 5/2006 | Rui |
| 7,039,253 B2 | 5/2006 | Matsuoka et al. |
| 7,042,440 B2 | 5/2006 | Pryor et al. |
| 7,054,452 B2 | 5/2006 | Ukita |
| 7,059,962 B2 | 6/2006 | Watashiba |
| 7,061,507 B1 | 6/2006 | Tuomi et al. |
| 7,071,914 B1 | 7/2006 | Marks |
| 7,090,352 B2 | 8/2006 | Kobori et al. |
| 7,098,891 B1 | 8/2006 | Pryor |
| 7,102,615 B2 | 9/2006 | Marks |
| 7,106,366 B2 | 9/2006 | Parker et al. |
| 7,116,330 B2 | 10/2006 | Marshall et al. |
| 7,116,342 B2 | 10/2006 | Dengler et al. |
| 7,121,946 B2 | 10/2006 | Paul et al. |
| 7,139,767 B1 | 11/2006 | Taylor et al. |
| 7,148,922 B2 | 12/2006 | Shimada |
| 7,158,118 B2 | 1/2007 | Liberty |
| 7,161,634 B2 | 1/2007 | Long |
| 7,164,413 B2 | 1/2007 | Davis et al. |
| 7,183,929 B1 | 2/2007 | Antebi et al. |
| 7,212,308 B2 | 5/2007 | Morgan |
| 7,224,384 B1 | 5/2007 | Iddan et al. |
| 7,227,526 B2 | 6/2007 | Hildreth et al. |
| 7,227,976 B1 | 6/2007 | Jung et al. |
| 7,239,301 B2 | 7/2007 | Liberty et al. |
| 7,245,273 B2 | 7/2007 | Eberl et al. |
| 7,259,375 B2 | 8/2007 | Tichit et al. |
| 7,262,760 B2 | 8/2007 | Liberty |
| 7,274,305 B1 | 9/2007 | Luttrell |
| 7,277,526 B2 | 10/2007 | Rifkin et al. |
| 7,283,679 B2 | 10/2007 | Okada et al. |
| 7,301,530 B2 | 11/2007 | Lee et al. |
| 7,305,114 B2 | 12/2007 | Wolff et al. |
| 7,346,387 B1 | 3/2008 | Wachter et al. |
| 7,364,297 B2 | 4/2008 | Goldfain et al. |
| 7,379,559 B2 | 5/2008 | Wallace et al. |
| 7,414,611 B2 | 8/2008 | Liberty |
| 7,446,650 B2 | 11/2008 | Scholfield et al. |
| 7,489,298 B2 | 2/2009 | Liberty et al. |
| 7,489,299 B2 | 2/2009 | Liberty et al. |
| 7,623,115 B2 | 11/2009 | Marks |
| 7,646,372 B2 | 1/2010 | Marks et al. |
| 7,874,917 B2 | 1/2011 | Marks et al. |
| 8,251,820 B2 | 8/2012 | Marks et al. |
| 8,303,411 B2 | 11/2012 | Marks et al. |
| 2001/0056477 A1 | 12/2001 | McTernan et al. |
| 2002/0010655 A1 | 1/2002 | Kjallstrom |
| 2002/0041327 A1 | 4/2002 | Hildreth et al. |
| 2002/0056114 A1 | 5/2002 | Fillebrown et al. |
| 2002/0072414 A1 | 6/2002 | Stylinski et al. |
| 2002/0075286 A1 | 6/2002 | Yonezawa et al. |
| 2002/0083461 A1 | 6/2002 | Hutcheson et al. |
| 2002/0085097 A1 | 7/2002 | Colmenarez et al. |
| 2002/0094189 A1 | 7/2002 | Navab et al. |
| 2002/0101568 A1 | 8/2002 | Eberl et al. |
| 2002/0110273 A1 | 8/2002 | Dufour |
| 2002/0126899 A1 | 9/2002 | Farrell |
| 2002/0134151 A1 | 9/2002 | Naruoka et al. |
| 2002/0158873 A1 | 10/2002 | Williamson |
| 2003/0014212 A1 | 1/2003 | Ralston et al. |
| 2003/0020718 A1 | 1/2003 | Marshall et al. |
| 2003/0021492 A1 | 1/2003 | Matsuoka et al. |
| 2003/0022716 A1 | 1/2003 | Park et al. |
| 2003/0032466 A1 | 2/2003 | Watashiba |
| 2003/0032484 A1 | 2/2003 | Ohshima et al. |
| 2003/0053031 A1 | 3/2003 | Wirth |
| 2003/0063065 A1 | 4/2003 | Lee et al. |
| 2003/0093591 A1 | 5/2003 | Hohl |
| 2003/0100363 A1 | 5/2003 | Ali |
| 2003/0120714 A1 | 6/2003 | Wolff et al. |
| 2003/0123705 A1 | 7/2003 | Stam et al. |
| 2003/0160862 A1 | 8/2003 | Charlier et al. |
| 2003/0169233 A1 | 9/2003 | Hansen |
| 2003/0169907 A1 | 9/2003 | Edwards et al. |
| 2003/0232649 A1 | 12/2003 | Gizis et al. |
| 2004/0001082 A1 | 1/2004 | Said |
| 2004/0017355 A1 | 1/2004 | Shim |
| 2004/0029640 A1 | 2/2004 | Masuyama et al. |
| 2004/0046736 A1 | 3/2004 | Pryor et al. |
| 2004/0047464 A1 | 3/2004 | Yu et al. |
| 2004/0063480 A1 | 4/2004 | Wang |
| 2004/0063481 A1 | 4/2004 | Wang |
| 2004/0070565 A1 | 4/2004 | Nayar et al. |
| 2004/0087366 A1 | 5/2004 | Shum et al. |
| 2004/0095327 A1 | 5/2004 | Lo |
| 2004/0120008 A1 | 6/2004 | Morgan |
| 2004/0140955 A1 | 7/2004 | Metz |
| 2004/0145457 A1 | 7/2004 | Schofield et al. |
| 2004/0150728 A1 | 8/2004 | Ogino |
| 2004/0178576 A1 | 9/2004 | Hillis et al. |
| 2004/0213419 A1 | 10/2004 | Varma et al. |
| 2004/0240542 A1 | 12/2004 | Yeredor et al. |
| 2004/0254017 A1 | 12/2004 | Cheng et al. |
| 2005/0037844 A1 | 2/2005 | Shum et al. |
| 2005/0047611 A1 | 3/2005 | Mao |
| 2005/0059488 A1* | 3/2005 | Larsen et al. .................. 463/36 |
| 2005/0078088 A1 | 4/2005 | Davis et al. |
| 2005/0088369 A1 | 4/2005 | Yoshioka |
| 2005/0102374 A1 | 5/2005 | Moragne et al. |
| 2005/0105777 A1 | 5/2005 | Koslowski et al. |
| 2005/0110949 A1 | 5/2005 | Goldfain et al. |
| 2005/0117045 A1 | 6/2005 | Abdellatif et al. |
| 2005/0198095 A1 | 9/2005 | Du et al. |
| 2005/0226431 A1 | 10/2005 | Mao |
| 2005/0239548 A1 | 10/2005 | Ueshima et al. |
| 2006/0033713 A1* | 2/2006 | Pryor ........................... 345/158 |
| 2006/0035710 A1 | 2/2006 | Festejo et al. |
| 2006/0204012 A1 | 9/2006 | Marks |
| 2006/0233389 A1 | 10/2006 | Mao et al. |
| 2006/0239471 A1 | 10/2006 | Mao |
| 2006/0252474 A1 | 11/2006 | Zalewski et al. |
| 2006/0252475 A1 | 11/2006 | Zalewski et al. |
| 2006/0252477 A1 | 11/2006 | Zalewski et al. |
| 2006/0252541 A1 | 11/2006 | Zalewski et al. |
| 2006/0256081 A1 | 11/2006 | Zalewski et al. |
| 2006/0264258 A1 | 11/2006 | Zalewski et al. |
| 2006/0264259 A1 | 11/2006 | Zalewski et al. |
| 2006/0264260 A1 | 11/2006 | Zalewski et al. |
| 2006/0269072 A1 | 11/2006 | Mao |
| 2006/0269073 A1 | 11/2006 | Mao |
| 2006/0274032 A1 | 12/2006 | Mao et al. |
| 2006/0274911 A1 | 12/2006 | Mao et al. |
| 2006/0277571 A1 | 12/2006 | Marks |
| 2006/0280312 A1 | 12/2006 | Mao |
| 2006/0282873 A1 | 12/2006 | Zalewski et al. |
| 2006/0287084 A1 | 12/2006 | Mao et al. |
| 2006/0287085 A1 | 12/2006 | Mao et al. |
| 2006/0287086 A1 | 12/2006 | Zalewski et al. |
| 2006/0287087 A1 | 12/2006 | Zalewski et al. |
| 2007/0015558 A1 | 1/2007 | Zalewski et al. |
| 2007/0015559 A1 | 1/2007 | Zalewski et al. |

(56) References Cited

U.S. PATENT DOCUMENTS

| | | |
|---|---|---|
| 2007/0021208 A1 | 1/2007 | Mao et al. |
| 2007/0025562 A1 | 2/2007 | Zalewski et al. |
| 2007/0060336 A1 | 3/2007 | Marks et al. |
| 2007/0061413 A1 | 3/2007 | Larsen et al. |
| 2007/0066394 A1 | 3/2007 | Ikeda et al. |
| 2007/0120834 A1 | 5/2007 | Boillot |
| 2007/0120996 A1 | 5/2007 | Boillot |
| 2007/0258599 A1 | 11/2007 | Mao |
| 2007/0260340 A1 | 11/2007 | Mao |
| 2007/0260517 A1 | 11/2007 | Zalewski et al. |
| 2007/0261077 A1 | 11/2007 | Zalewski et al. |
| 2007/0274535 A1 | 11/2007 | Mao |
| 2007/0298882 A1 | 12/2007 | Marks et al. |
| 2008/0056561 A1 | 3/2008 | Sawachi |
| 2008/0070684 A1 | 3/2008 | Haigh-Hutchinson |
| 2009/0010494 A1 | 1/2009 | Bechtel et al. |
| 2009/0016642 A1 | 1/2009 | Hart |

FOREIGN PATENT DOCUMENTS

| | | |
|---|---|---|
| EP | 0652686 A | 5/1995 |
| EP | 0750202 A | 12/1996 |
| EP | 0835676 A | 4/1998 |
| EP | 0867798 | 9/1998 |
| EP | 1033882 | 9/2000 |
| EP | 1074934 | 2/2001 |
| EP | 1335338 | 8/2003 |
| EP | 1358918 | 11/2003 |
| EP | 1411461 | 4/2004 |
| EP | 1435258 | 7/2004 |
| EP | 1489596 A | 12/2004 |
| FR | 2780176 | 6/1988 |
| FR | 2814965 | 4/2002 |
| FR | 2832892 | 5/2003 |
| GB | 2206716 | 11/1989 |
| GB | 2376397 | 12/2002 |
| GB | 2388418 | 11/2003 |
| GB | 2398691 | 8/2004 |
| JP | 1284897 | 11/1989 |
| JP | 6102980 | 4/1994 |
| JP | 7311568 | 11/1995 |
| JP | 9128141 | 5/1997 |
| JP | 9185456 | 7/1997 |
| JP | 1138949 | 2/1999 |
| JP | 2000172431 | 6/2000 |
| JP | 2000259856 | 9/2000 |
| JP | 2000350859 | 12/2000 |
| JP | 2001166676 | 6/2001 |
| JP | 2002369969 | 12/2002 |
| JP | 2004145448 | 5/2004 |
| JP | 2005046422 | 2/2005 |
| WO | WO8805942 | 8/1988 |
| WO | WO9848571 | 10/1998 |
| WO | WO9935633 | 7/1999 |
| WO | WO9926198 | 10/1999 |
| WO | WO0118563 | 3/2001 |
| WO | WO0227456 | 2/2002 |
| WO | WO03079179 | 9/2003 |
| WO | WO2004041379 | 5/2004 |
| WO | WO2004073814 | 9/2004 |
| WO | WO2004073815 | 9/2004 |
| WO | WO2005073838 | 8/2005 |
| WO | WO2005107911 | 11/2005 |
| WO | WO2006121896 | 11/2006 |

OTHER PUBLICATIONS

Advisory Action dated Jun. 12, 2007 issued for U.S. Appl. No. 10/663,236.

CFS and FS95/98/2000: How to Use the Trim Controls to Keep Your Aircraft levelhttp://support.microsoft.com/?scid=kb%3Ben-us%3B175195&x=13&y=15, downloaded on Aug. 10, 2007.

Definition of "mount"—Merriam-Webster Online Dictionary; downloaded from the Internet <http://www. M-w.com/dictionary/mountable>, downloaded on Nov. 8, 2007.

Fiala, et al., "A Panoramic Video and Acoustic Beamforming Sensor for Videoconferencing", 2004 IEEE, Computational Video Group, National Research Council, Ottawa, Canada KIA OR6.

Final Office Action dated Feb. 21, 2008 issued for U.S. Appl. No. 10/663,236.

Final Office Action dated Mar. 3, 2009 issued for U.S. Appl. No. 10/663,236.

Final Office Action dated Mar. 3, 2009 issued for U.S. Appl. No. 11/301,673.

Final Office Action dated Mar. 7, 2007 issued for U.S. Appl. No. 10/663,236.

Final Office Action dated Sep. 22, 2008for U.S. Appl. No. 10/759,782.

Fujitsu, "Internet Development of Emulators" Abstract, Mar. 1997, vol. 48, No. 2.

Gvili, et al., "Depth Keying", SPIE vol. 5006 (2003), 2003 SPIE-IS &T, pp. 564-574 (031).

Hemmi, et al., "3-D Natural Interactive Interface-Using Marker Tracking from a Single View",Sep. 9, 1991, Systems and Computers in Japan.

Iddan et al., "3D Imaging in the Studio (and elswhere. . )", Proceedings of the SPIE, SPIE, Bellingham, VA, US, vol. 4298, Jan. 24, 2001, pp. 48-55, XP008005351.

Iddan, et al., "3D Imaging in the Studio (and Elsewhere . . )", Proceedings of the SPIE, SPIE, Bellingham, VA, US, vol. 4298, Jan. 24, 2001, pp. 48-55, XP008005351.

International Search Report and Written Opinion for International Application No. PCT/US06/61056 dated Mar. 3, 2008.

Jojic, et al., "Tracking Self-Occluding Articulated Objects in Dense Disparity Maps", Computer Vision, 1999, The Proceedings of the Seventh IEEE International Conference on Kerkyra, Greece Sep. 20-27, 1999, Los Alamitos, CA, US, IEEE Computer Society, US, Sep. 20, 1999, pp. 123-130.

Jojie et al., Tracking self-occluding Articulated Objects in Dense Disparity Maps, Computer Vision, 1999. The Proceedings of the seventh IEEE International Conference on Kerkyra, Greece Sep. 20-27, 1999, Los Alamitos, CA, USA, IEEE Comput, Soc, Us, Sep. 20, 1999, pp. 123-130.

K. B. Shimoga, et al., "Touch and Force Reflection for Telepresence Surgery", Engineering in Medicine and Biology Opportunities of the IEEEE, Baltimore, MD, USA, Nov. 3, 1994, New York, New York, USA, pp. 1049-1050.

Kanade, et al., "A Stereo Machine for Video-rate Dense Depth Mapping and Its New Application" 1996, CVPR 96, IEEE Computer Society Conference, pp. 196-202 (022).

Kevin W. Wilson et al., "Audio-Video Array Source Localization for Intelligent Environments", IEEE 2002, vol. 2, pp. 2109-2112.

Klinker et al., "Distribute User Tracking Concepets for Augmented Reality Applications" pp. 37-44, Augmented Reality, 2000, IEEE and ACM Int'l Symposium, 1012000, XP010520308, ISBN: 0-7695-0846-4, Germany.

Klinker, et al., "Distributed User Tracking Concepts for Augmented Reality Applications", pp. 37-44, Augmented Reality, 2000, IEEE and ACM Int'l Symposium, Oct. 2000, XP010520308, ISBN: 0-7695-0846-4, Germany.

Mark Fiala et al., "A Panoramic Video and Acoustic Beamforming Sensor for Videoconferencing" Oct. 2004.

Mihara, et al., "A Realtime Vision-Based Interface Using Motion Processor and Applications to Robotics", vol. 184-D-11, No. 9, pp. 2070-2078, Sep. 2001, Japan.

Nakagawa, et al., "A Collision Detection and Motion Image Synthesis Between a Background Image and a Foreground 3-Dimensional Object", TVRSJ Bol. 4, No. 2, pp. 425-430, 1999, Japan.

Nakamura, et al., "A Consideration on Reconstructing 3-D Model Using Object Views", 2004-01601-003, pp. 17-21, Kokkaido University, Japan, nakamura©media.eng.hokudai.ac.jp.

Nishida, et al., "A Method of Estimating Human Shapes by Fitting the Standard Human Model to Partial Measured Data", D-II vol. J84-D-II, No. 7, pp. 1310-1318, 0712001.

Non-Final Notification of Reasons for Refusal from Japanese Intellectual Property Office (JPO) dated Jul. 27, 2010 issued for Japanese Patent Application No. 2008-545898.

(56) References Cited

OTHER PUBLICATIONS

Non-Final Office Action dated Nov. 30, 2011 for U.S. Appl. No. 13/169,440.
Notice of Allowance and Fee(s) Due dated Jun. 2, 2009 for U.S. Appl. No. 10/759,782.
Notice of Allowance and Fee(s) Due dated Nov. 14, 2007 for U.S. Appl. No. 10/759,782.
Notice of Allowance and Fees Due dated Aug. 12, 2009 issued for U.S. Appl. No. 11/301,673.
Notice of Allowance issued date Jul. 10, 2012 for U.S. Appl. No. 12/903,140, entitled "Methods and Systems for Enabling Depth and Direction Detection When Interfacing With a Computer Program".
Office Action dated Aug. 31, 2007 issued for U.S. Appl. No. 10/663,236.
Office Action dated Feb. 27, 2008 for U.S. Appl. No. 10/759,782, mailed Feb. 27, 2008.
Office Action dated Jul. 11, 2008 issued for U.S. Appl. No. 10/663,236.
Office Action dated Jun. 25, 2007 for U.S. Appl. No. 10/759,782.
Office Action dated Mar. 10, 2009 for U.S. Appl. No. 10/759,782.
Office Action dated Mar. 17, 2010 issued for U.S. Appl. No. 10/663,236.
Office Action dated Nov. 2, 2006 issued for U.S. Appl. No. 10/663,236.
Office Action dated Sep. 1, 2009 issued for U.S. Appl. No. 10/663,236.
Office Action dated Sep. 11, 2008 issued for U.S. Appl. No. 11/301,673.
Richardson et al., "Virtual Network Computing" IEEE Internet Computing, vol. 2, No. 1 Jan./Feb. 1998.
U.S Appl. No. 29/246,767, entitled "Video Game Controller," filed May 8, 2006.
U.S. Appl. No. 12/903,140, filed Oct. 12, 2010.
U.S. Appl. No. 29/246,743, entitled "Video Game Controller" to Teiyu Goto, filed May 8, 2006.
U.S. Appl. No. 29/246,744, entitled "Video Game Controller Front Face", to Teiyu Goto, filed May 8, 2006.
U.S. Appl. No. 29/246,759 entitled "Game Controller Device With LEDS and Optical Ports" filed May 8, 2006.
U.S. Appl. No. 29/246,762, entitled "Ergonomic Game Interface Device With LEDS and Optical Ports" filed May 8, 2006.
U.S Appl. No. 29/246,763, entitled "Ergonomic Game Controller Device with LEDS and Optical Ports", filed May 8, 2006.
U.S. Appl. No. 29/246,764, entitled "Game Interface Device with LEDS and Optical Ports" filed May 8, 2006.
U.S. Appl. No. 29/246,765, entitled "Designing for Optical Game Controller Interface", filed May 8, 2006.
U.S. Appl. No. 29/246,766, entitled "Dual Grip Game Control Device with LEDS and Optical Ports" filed May 8, 2006.
U.S. Appl. No. 29/246,768, entitled "Video Game Controller," filed May 8, 2006.
U.S. Appl. No. 29/259,348, entitled, "Tracked Controller Device," to Gary Zalewski, filed May 6, 2006.
U.S. Appl. No. 29/259,349, entitled "Controller with Infrared Port" to Teiyu Goto, filed May 6, 2006.
U.S. Appl. No. 29/259,350, entitled "Controller with Tracking Sensors" to Gary Zalewski, filed May 6, 2006.
U.S. Appl. No. 60/798,031, entitled "Dynamic Targt Interface", to Bruce Woodard, filed May 6, 2006.
US 2002/0018582 Al, Feb. 2002, Hagiwara et al. (withdrawn).
Wilson & Darrell, "Audio-Video Array Source Localization for Intelligent Environments", 2002 IEEE Dept. of Electrical Eng and Computer Science, MIT, Cambridge, MA 02139.
Y. Ephraim and D. Malah, "Speech Enhancement Using a Minimum Mean-square Error Log-Spectral Amplitude Estimator," IEEE Trans. Acoust., Speech, Signal Processing, vol. ASSP-33, pp. 443-445, Apr. 1985.
Y. Ephraim and D. Malah, "Speech Enhancement Using a Minimum Mean-square Error Short-time Spectral Amplitude Estimator," IEEE Trans. Acoust., Speech, Signal Processing, vol. ASSP-32, pp. 1109-1121.
Official Letter dated Aug. 2, 2013 for European Application No. 06848950.3.
Search Report dated Sep. 27, 2012 for European Application No. 06848950.3.

\* cited by examiner

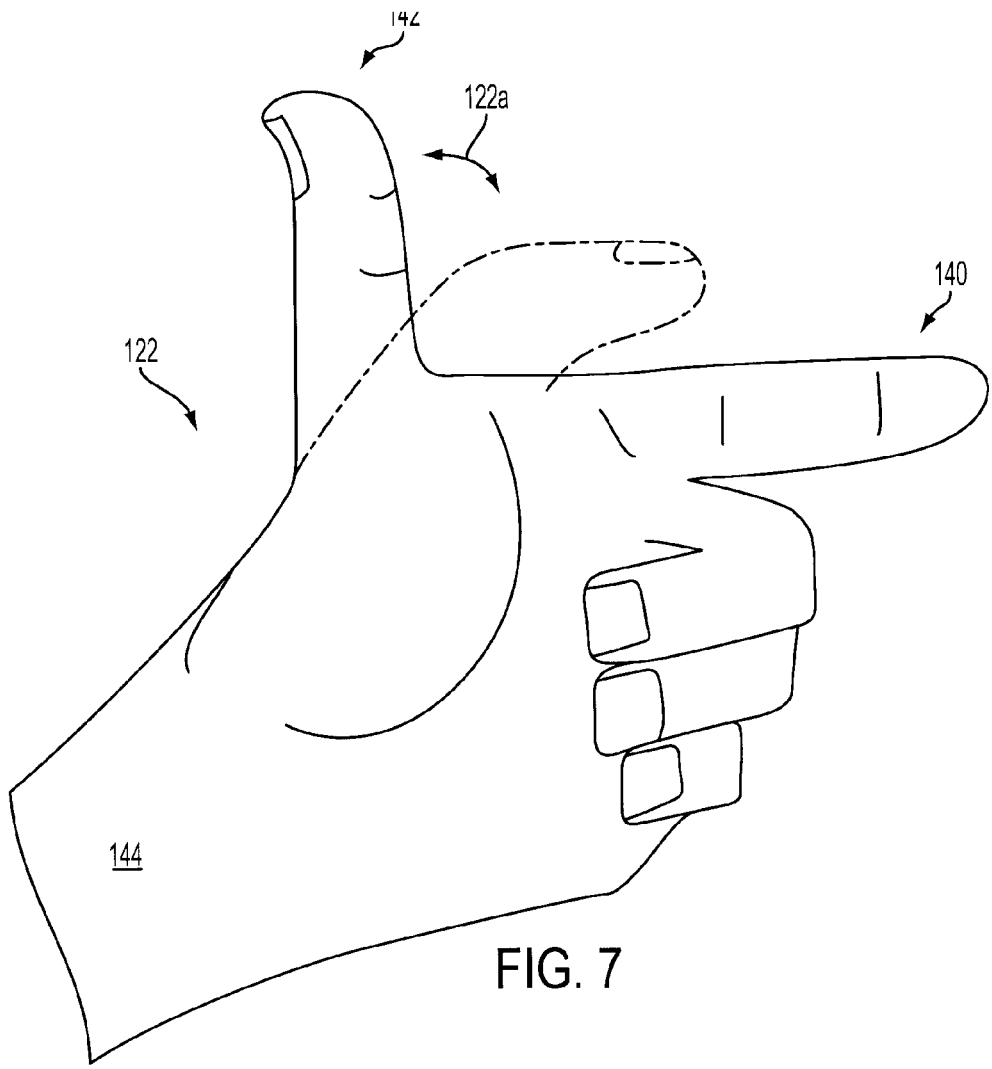
FIG. 7
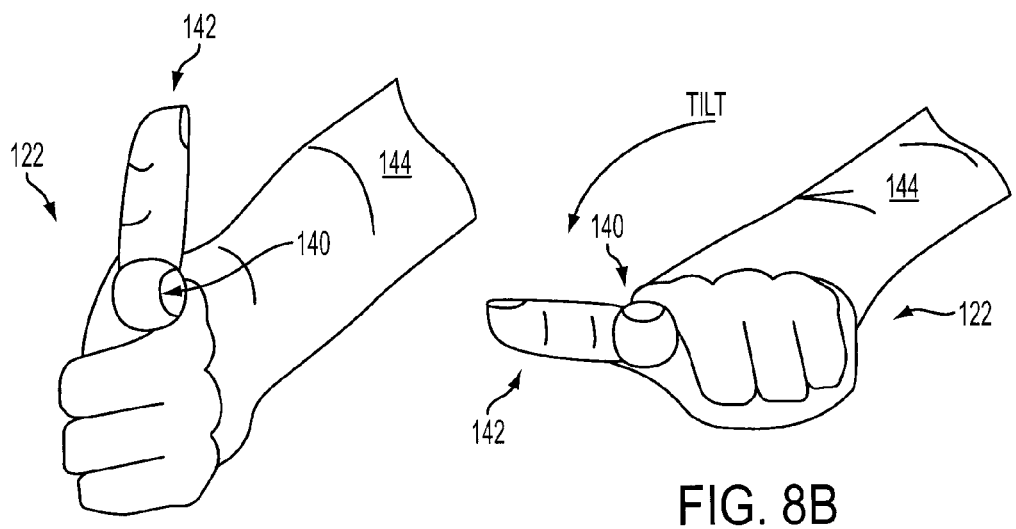
FIG. 8A
FIG. 8B

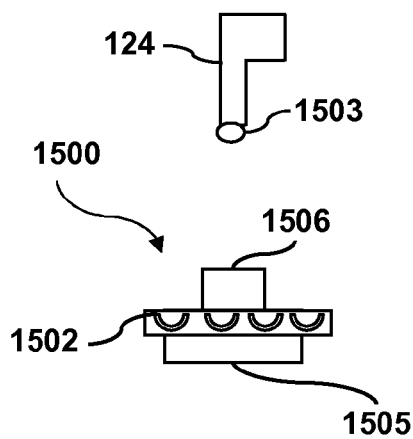
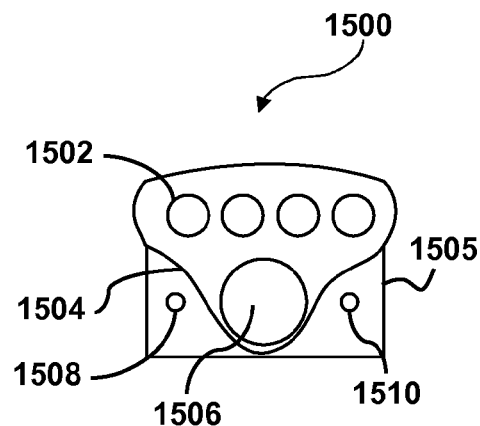
FIG. 15A     FIG. 15B
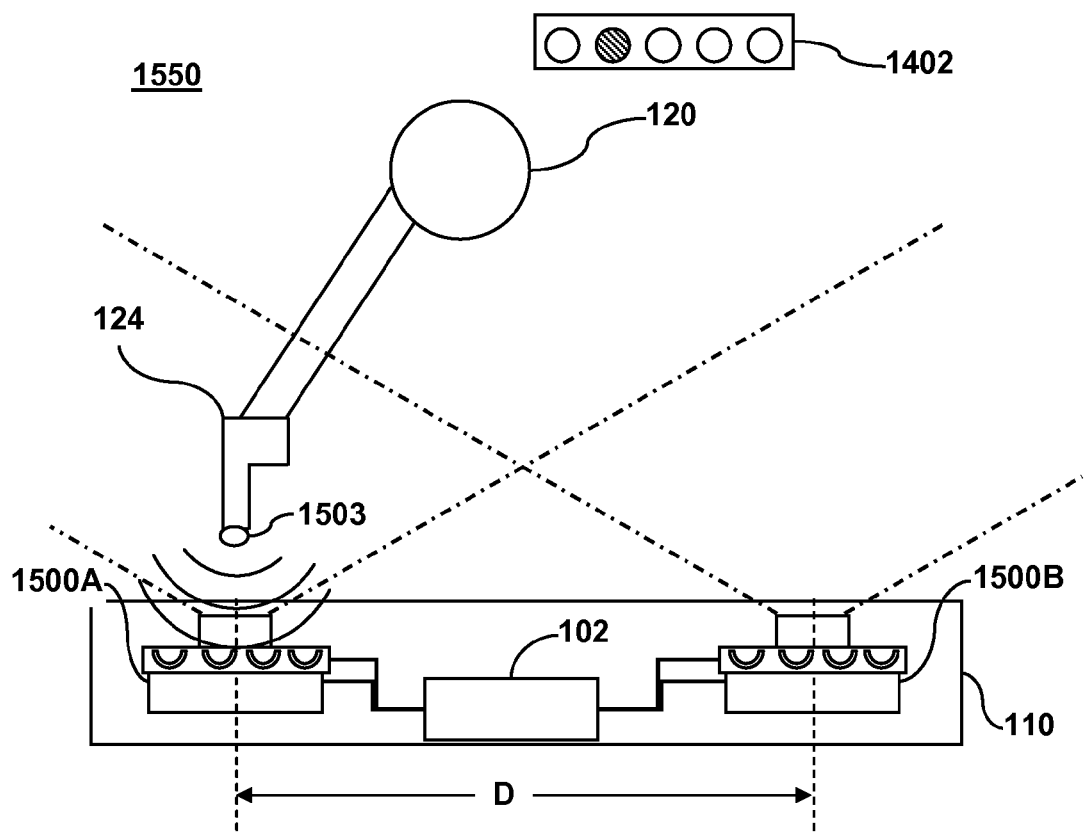
FIG. 15C

METHODS AND SYSTEMS FOR ENABLING DEPTH AND DIRECTION DETECTION WHEN INTERFACING WITH A COMPUTER PROGRAM

CLAIM OF PRIORITY

This application is a continuation of and claims the benefit of priority of commonly-assigned co-pending U.S. patent application Ser. No. 13/169,440 filed Jun. 27, 2011, the entire contents of which are incorporated herein by reference. This application is a continuation of and claims the benefit of priority of commonly-assigned co-pending U.S. patent application Ser. No. 12/903,140, filed Oct. 12, 2010, the entire contents of which are incorporated herein by reference. This application is a continuation of and claims the benefit of priority of commonly-assigned co-pending U.S. patent application Ser. No. 11/302,511, filed Dec. 12, 2005, the entire contents of which are incorporated herein by reference. U.S. patent application Ser. No. 11/302,511 is a continuation in part of U.S. patent application Ser. No. 10/663,236, entitled "METHOD AND APPARATUS FOR ADJUSTING A VIEW OF A SCENE BEING DISPLAYED ACCORDING TO TRACKED HEAD MOTION", filed on Sep. 15, 2003, and published as U.S. Patent Application Publication Number 20050059488 the entire contents of which are incorporated by reference. U.S. patent application Ser. No. 11/302,511 is a continuation in part of U.S. patent application Ser. No. 10/759,782, entitled "METHOD AND APPARATUS FOR LIGHT INPUT DEVICE", filed on Jan. 16, 2004, the entire contents of which are incorporated by reference. U.S. patent application Ser. No. 11/302,511 is also related to U.S. patent application Ser. No. 11/301,673, (now U.S. Pat. No. 7,646,372) entitled "METHODS AND SYSTEMS FOR ENABLING DIRECTION DETECTION WHEN INTERFACING WITH A COMPUTER PROGRAM" to inventors Richard L. Marks and Hrishikesh R. Deshpande, filed Dec. 12, 2005, the entire contents of which are incorporated herein by reference.

BACKGROUND

Description of the Related Art

The video game industry has seen many changes over the years. As computing power has expanded, developers of video games have likewise created game software that takes advantage of these increases in computing power. To this end, video game developers have been coding games that incorporate sophisticated operations and mathematics to produce a very realistic game experience.

Examples of gaming platforms include the Sony PlayStation or Sony PlayStation2 (PS2), each of which is sold in the form of a game console. As is well known, the game console is designed to connect to a monitor (usually a television) and enable user interaction through handheld controllers. The game console is designed with specialized processing hardware, including a CPU, a graphics synthesizer for processing intensive graphics operations, a vector unit for performing geometry transformations, and other glue hardware, firmware, and software. The game console is further designed with an optical disc tray for receiving game compact discs for local play through the game console. Online gaming is also possible, where a user can interactively play against or with other users over the Internet.

As game complexity continues to intrigue players, game and hardware manufacturers have continued to innovate to enable additional interactivity. In reality, however, the way in which users interact with a game has not changed dramatically over the years. Commonly, users still play computer games using hand held controllers or interact with programs using mouse pointing devices.

In view of the foregoing, there is a need for methods and systems that enable more advanced user interactivity with game play.

SUMMARY OF THE INVENTION

Broadly speaking, the present invention fills these needs by providing an apparatus and method that facilitates interactivity with a computer program. In one embodiment, the computer program is a game program, but without limitation, the apparatus and method can find applicability in any consumer electronic device that will require a user to interact therewith. The present invention simplifies user interaction experience through machine recognizable gestures based on pointing to the interface and discriminating commands based on factors including trigger cues and position determination of a hand or object under user control.

In one embodiment, a method for detecting direction when interfacing with a computer program is described. The method includes capturing an image presented in front of an image capture device. The image capture device has a capture location in a coordinate space. When a person is captured in the image, the method includes identifying a human head in the image and assigning the human head a head location in the coordinate space. The method also includes identifying an object held by the person in the image and assigning the object an object location in coordinate space. The method further includes identifying a relative position in coordinate space between the head location and the object location when viewed from the capture location. The relative position includes a dimension of depth. This dimension of depth may be determined stereoscopically through use of two cameras or through the use of sound location techniques or by combination thereof.

In another embodiment, a method for detecting pointing direction of an object directed toward a display screen that can render graphics of a computer program is provided. The method includes capturing an image presented in front of an image capture device. The image capture device has a capture location in a coordinate space that is proximate to the display screen. When a person is captured in the image, the method includes identifying a first body part of the person in the image and assigning the first body part a first location in the coordinate space. Then the method includes identifying a second body part of the person in the image and assigning the second body part a second location in coordinate space. Once the first and second body parts are identified, the method moves to identifying a relative position in coordinate space between the first location and the second location when viewed from the capture location. The relative position includes a dimension of depth which may be determined, e.g., stereoscopically through use of two cameras, through the use of sound location techniques or through a combination thereof.

In one embodiment, an apparatus for capturing image and sound during interactivity with a computer program is provided. The apparatus includes an image capture unit that is configured to capture one or more image frames. These image frames are analyzed to identify a person's head and a person's hand. Based on the relative positioning of the hand and head, the apparatus can ascertain a pointing direction, which may be translated as the pointing location on a display screen.

Other aspects and advantages of the invention will become apparent from the following detailed description, taken in conjunction with the accompanying drawings, illustrating by way of example the principles of the invention.

BRIEF DESCRIPTION OF THE DRAWINGS

The invention, together with further advantages thereof, may best be understood by reference to the following description taken in conjunction with the accompanying drawings.

FIGS. 7 and 8A-8B illustrate examples of hand positions, when the hand positions and shapes are analyzed to determine a desired trigger or tracking response by the computer program, in accordance with one embodiment of the present invention.

FIGS. 15A-15B illustrate an image capture device including adapted to determine the depth of an object using sound location.

FIG. 15C illustrates an interactive game setup that utilizes sound location to determine the depth of an object.

DETAILED DESCRIPTION

In the following description, numerous specific details are set forth in order to provide a thorough understanding of the present invention. It will be apparent, however, to one skilled in the art that the present invention may be practiced without some or all of these specific details. In other instances, well known process steps have not been described in detail in order not to obscure the present invention.

Figure 1A:
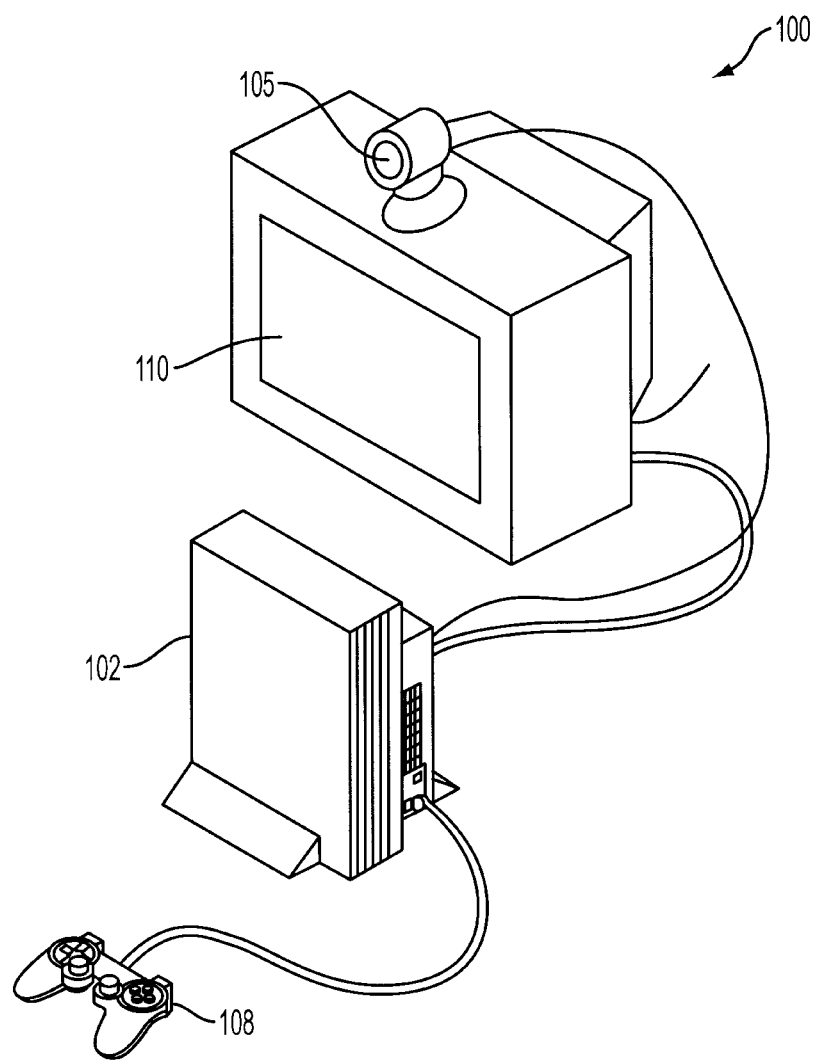
FIGS. 1A and 1B illustrate the environment of one embodiment of present invention, which takes advantage of the pointing direction determination described herein.

FIG. 1A illustrates an interactive game setup 100, in accordance with one embodiment of the present invention. The interactive game setup 100 includes a computer 102 that is coupled to a display screen 110. An image capture device 105 is placed on top of the display screen 110 and is coupled to the computer 102. Computer 102 is, in one embodiment, a gaming system console which allows users to play video games and interface with the video games through controllers 108.

The image capture device 105 is shown placed on top of the display screen 110, but it should be understood that the image capture device 105 can be placed in any other proximate location that will allow it to capture images that are located about in front of the display screen 110. Techniques for capturing these movements and interactions can vary, but exemplary techniques are described in United Kingdom Applications GB 0304024.3 (PCT/GB2004/000693) and GB 0304022.7 (PCT/GB2004/000703), each filed on Feb. 21, 2003, and each of which is hereby incorporated by reference.

In a specific example, but not limited to any brand, the game console can be a one manufactured by Sony Computer Entertainment Inc., Nintendo, Microsoft, or any other manufacturer. The image capture device 105 can be as simple as a standard web cam or can include more advanced technology. In one embodiment, the image capture device should be capable of capturing images, digitizing the images, and communicating the image data back to the computer 102. In some embodiments, the image capture device will have logic integrated therein for performing the digitizing and another embodiment the image capture device 105 will simply transmit the captured data back to the computer 102 for digitizing. In either case, the image capture device 105 is capable of capturing either color or black and white images of any object located in front of the image capture device 105.

Figure 1B:
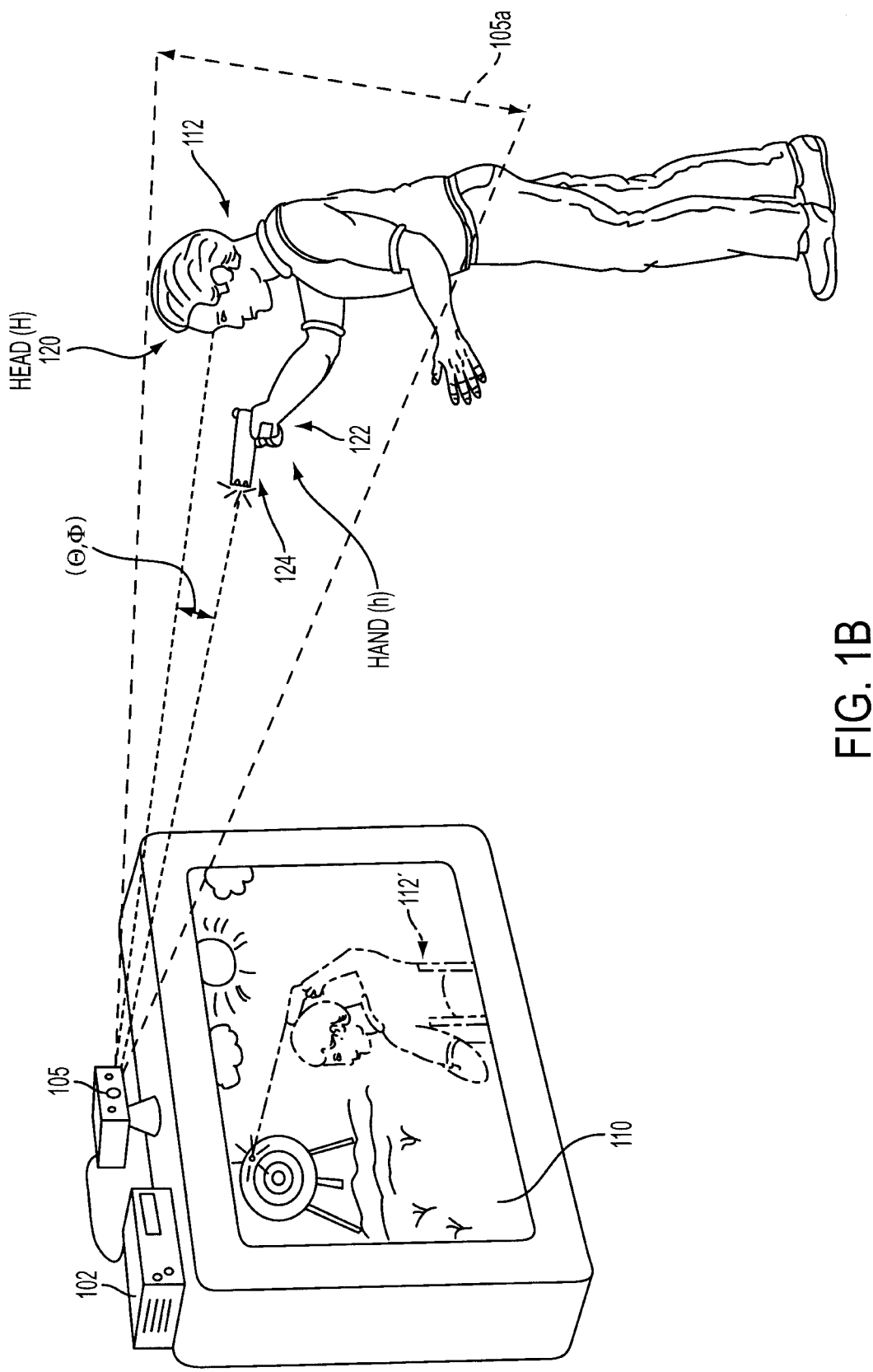

FIG. 1B illustrates an exemplary embodiment of the present invention in which the computer 102 processes image data provided by the image capture device 105 to ascertain a pointing direction of an object placed in front of the image capture device 105. As shown, the computer 102 is connected to the image capture device 105. The image capture device 105 is designed to focus onto a capture region 105a. In this example, a person 112 is intending to interact with a computer program being executed by the computer 102. The computer program, in this example, is a video game which is rendered and displayed by the display screen 110.

For example purposes only, the video game is a target shooting game in which the person 112 wishes to aim at a target and earn points commensurate with his or her performance. As illustrated on the display screen 110, an image 112' of the person 112 may also be placed on the display screen 110 during game play. Alternatively, the person's image 112' may be omitted from the display screen, depending on the particular device under control or game being played. In this example, the user experience may be enhanced by illustrating an image 112' of the person 112 during the target shooting exercise to present more reality during game play. A feature of the target shooting game is the ability for person 112 to point or direct an object 124 at particular interactive graphics on the display screen 110.

To achieve accurate pointing direction of the object 124, which in this case and for example purposes is a gun, the person 112 will hold the object 124 with his or her hand 122. The hand 122 will be directionally pointed toward the display screen 110. The image capture device 105 will at this point, analyze the digital image capture of the person 112 to determine the location of the person's 112 head 120, and the location of the person's 112 hand 122. As shown, the person's 112 hand is extended in front of his body and the image capture device will identify the object 124 when examining the captured digital image. The captured digital image will also be examined by code executed at the computer 102 to ascertain the location of the person's 112 head 120. In one embodiment, head tracking is completed with a combination of a template matching (for speed performance), coupled to a face detection code. The face detection code will essentially identify the location of the user's face by locating the user's eyes and other facial features. For additional information on head and face detection, reference may be made to co-pending U.S. patent application Ser. No. 10/663,236, entitled "METHOD AND APPARATUS FOR ADJUSTING A VIEW OF A SCENE BEING DISPLAYED ACCORDING TO TRACKED HEAD MOTION", filed on Sep. 15, 2003.

The object 124 will, in one embodiment, have an identifier which may be color or lights (e.g., light emitting diodes "LEDs") coupled to the object so that the program analyzing the captured digital image will easily identify the location of the object 124. Once the computer program has identified the location of the person's head 120 (H) and the location of the person's hand 122 (h), the computer program will perform computations to determine a relative angle from the image capture device position, and between the detected object 124, and the head 120.

As illustrated in FIG. 1B, the relative position of the object 124 and the head 120 will be calculated relative to the image capture device 105. This will produce two angle parameters (theta $\theta$ and phi $\Phi$). The azimuth angle $\theta$ will define the horizontal positioning between the head 120 and the object 124 along an X axis. The phi angle $\Phi$ will produce the altitude angle which is the relative angle between the height of the head 120 and the height of the hand 122. In one embodiment, an initial calibration operation may be performed before a gaming operation begins to calibrate the object's pointing location on the display screen 110. For instance, the user may be prompted to calibrate the pointing algorithm by having the user point the object 124 at a specific location on the display screen 110. Once the calibration has been completed, the computer 102 will be able to calculate the azimuth angle and the altitude angle (theta and phi) which define the relative positions of the person's head 120 and the person's hand 122, for each successive frame being captured by the image capture device 105. The relative positioning between the head and the hand may be calculated for each captured frame or may be captured every other frame, or after a number of frames are captured, depending on the accuracy required for the pointing operation. For example, if the game is a shooting gallery game, it would be important for the relative positioning of the head 120 and the hand 122 to be computed for each frame so that the person 112 will have accurate aiming and triggering capabilities when attempting to secure a good performing score in the video game contest.

Figure 2:
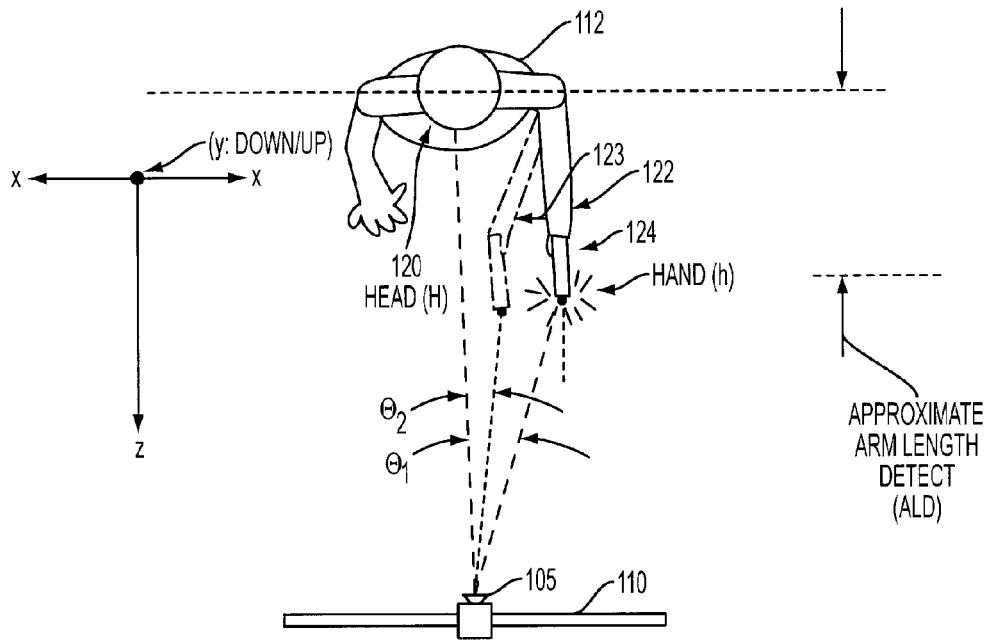
FIGS. 2-4 illustrate the analysis of the relative positions between a person's head and a person's hand (or object held by the person), when determining pointing direction.

FIG. 2 illustrates a top view of the person 112 who is positioned in front of the display screen 110, in accordance with one embodiment of the present invention. In this example, an initial azimuth angle (theta$_1$) is shown being determined as the relative angle between the position of the hand 122 (which is holding object 124), and the head 120. The person 112, during interactive play with the computer program, will be facing the display screen 110 and most likely, will maintain his body substantially parallel to the display screen 110. When the person 112 maintains his body substantially parallel to the display screen 110, movement of the hand 122 in direction 123 will cause the azimuth angle to be recomputed and produce a new azimuth angle theta$_2$.

In this example, the person 112 is holding the object 124 out in front of his body at about arm's length. This distance is shown to be the approximate arm's length detect (ALD) that defines the location of the approximate place where the image capture device 105 will attempt to capture the position of the hand 122 and associated object 124. The approximate arm's length detect (ALD) can vary, depending upon the user's arm length, but generally should be provided to allow a distance relationship between the location of the head 120 and the hand 122. For instance, there should be at least a minor projection of the hand 122 in front of the person's body to point to different locations of the display screen 110.

Figure 3:
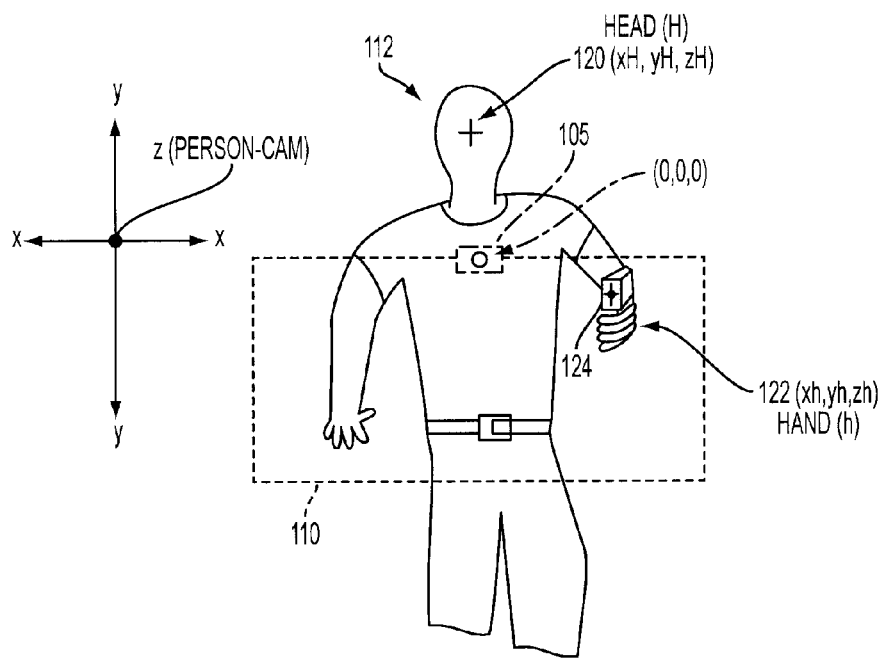

FIG. 3 illustrates a front view of the person 112 where the head 120 is identified and the hand 122 is identified, from the captured digital image. In this example, a dashed line represents the display screen 110 and the image capture device 105 that is directionally pointed at the person 112. In this example, the image capture device 105 will be illustrated to be at a coordinate space of (0, 0, 0), representing the reference point of the image capture device 105, and its position in coordinate space. The approximate location of the head 120 will also have an associated coordinate space (x H, y H, z H). Likewise, the hand 122 and the associated object 124 that is held by the hand 122 will have a coordinate space (x h, y h, z h) that is relative to the image capture device 105.

Figure 4:
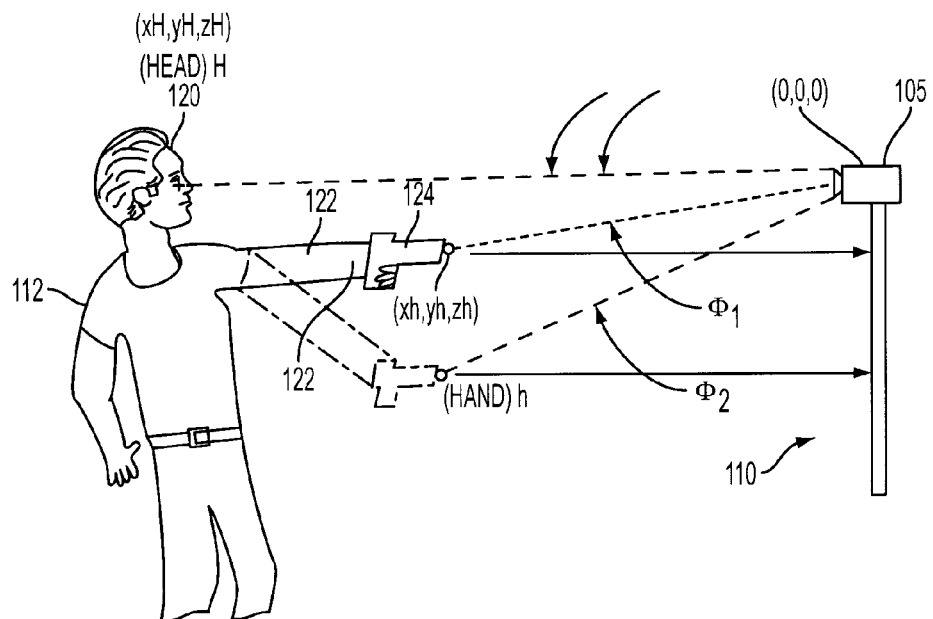

FIG. 4 illustrates the person 112 pointing the object 124 at the display screen 110. In this example, the coordinate space of the head 120 is identified in the digital image captured by the capture device 105. The location in coordinate space of the hand 122 is also captured in the digital image captured by the image capture device 105 when the person 112 is pointing at the display screen 110. The image capture device 105 is the reference point, which is at the coordinate space (0, 0, 0). The altitude angle phi is therefore calculated between the position of the head 120 relative to the position of the hand 122. In one example, the angle is calculated as:

Altitude angle=arctan(($yh$−$yH$)/($zh$−$zH$))

In a similar manner, the azimuth angle theta of FIG. 2 is calculated as:

Azimuth angle=arctan(($xh$−$xH$)/($zh$−$zH$))

When the user moves his hand down (e.g., as captured in a later frame) as illustrated in FIG. 4, a new angle phi$_2$ will be produced to define the new relative position between the hand 122 and the head 120 of the person 112. Based on this new relative positioning of the head and the hand, the computer 102 will re-position the pointing direction on the display screen.

Figures 5A, 5B, 5C:
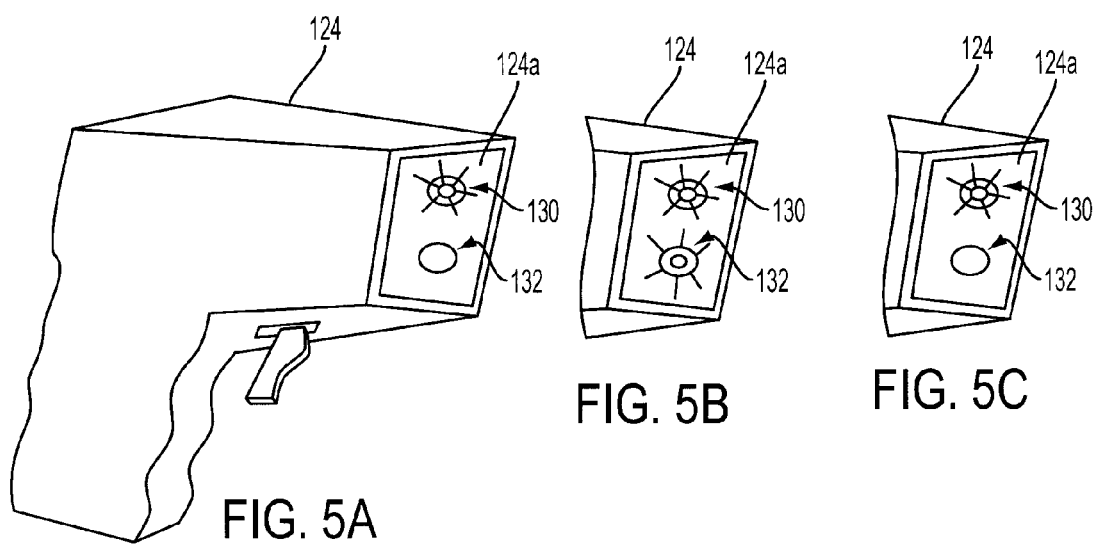
FIGS. 5A-5C illustrate tracking and triggering embodiments, which can be identified by the computer program by the analysis of the captured image data, in accordance with one embodiment of the present invention.

FIG. 5A illustrates an embodiment where the object 124 is a gun. The gun may be a simplified gun object that is configured to be pointed in the direction of the display screen 110 to hit particular objects or interact with objects on the display screen 110. In this example, the gun 124 will include a detection region 124$a$. Detection region 124$a$ is the region which is directionally pointed toward the display screen 110. The detection region 124$a$ is also the region that is captured by the image capture device 105 for analysis of the digital image by the computer 102. In one embodiment, the detection region 124$a$ is configured to include a pair of lighting objects that will assist in the interactivity with the computer program being executed by the computer 102 and displayed on the display screen 110. In this example, a tracking indicator 130 is provided as a light or color object that is present on the detection region 124$a$. Based on the tracking indicator 130, the image capture device 105 will produce a digital image that will be analyzed by the computer 102 to identify the position in coordinate space of the object 124. In this example, by providing the tracking indicator 130, the computer program being executed on the computer 102 is able to quickly identify the location of the object 124 and in relation to the head 120 of the person interacting with the computer program.

The tracking indicator 130 may be provided by way of a number of implementations. One implementation might be a light indicator that can be tracked by the computer program that analyzes the captured digital images, or may be in the form of a color indicator that the computer can identify quickly from the captured digital images. The hand itself may be the tracking indicator 130. In still another embodiment, the tracing indicator 130 may be provided as a reflective tape that will have different coloring or intensity depending on the angle that it might be displayed when shown to the image capture device 105. In this example, the object 104 is tracked as the user moves his hand 122 to different regions pointed to on the display screen 110.

In one embodiment, while the user moves his hand 122 relative to the head 120, the tracking indicator 130 will allow the computer program to provide a visual indicator on the display screen 110. This visual indicator on the display screen 110 will allow the user to understand where the object is currently pointing to on the display screen 110.

In another embodiment, the detection region 124a will also include a trigger indicator 132. The trigger indicator 132 may be in the form of a light that is triggered ON and OFF when the user pulls the trigger of the object 124. For instance, the detection region 124a is shown in FIG. 5B after the trigger has been pulled and the trigger indicator 132 is lit. When the trigger indicator 132 is lit as shown in FIG. 5B, the computer program executing on the computer 102 will provide an indicator on the display screen 110 so that the user can identify whether his or her pointing has accurately hit an object of the computer game. In FIG. 5C, the trigger indicator 132 is shown to be in the OFF position to signify that the object 124 will still remain actively tracked, but the shooting which can be continuous or intermittent, can be discontinued when the user removes his finger from the trigger of the object 124. The trigger indicator 132 may be in any frequency range, including audio, ultrasonic, visible lightwave, infrared and radio. Passive trigger indication may be achieved with the trigger indicator 132. For example a mechanical sound may be generated upon actuating a trigger and the sound may be received and decoded at an audio input to the computer 102 to determine whether the trigger was actuated.

Figure 6A:
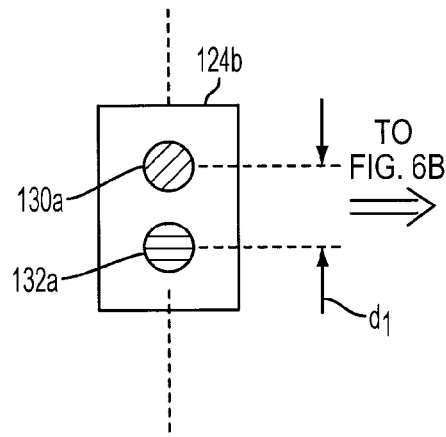
FIGS. 6A-6F illustrate alternate embodiments of detecting an object and detecting changes in the object based on relative orientation of the object itself, in accordance with one embodiment of the present invention.
Figure 6B:
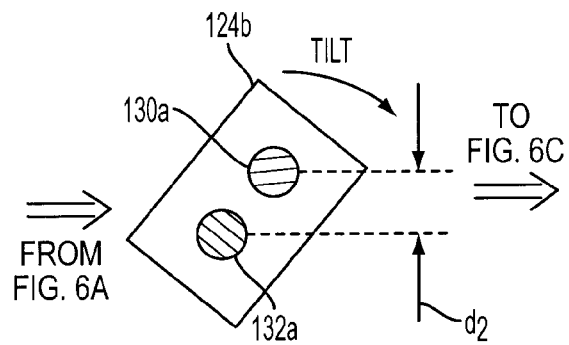
Figure 6C:
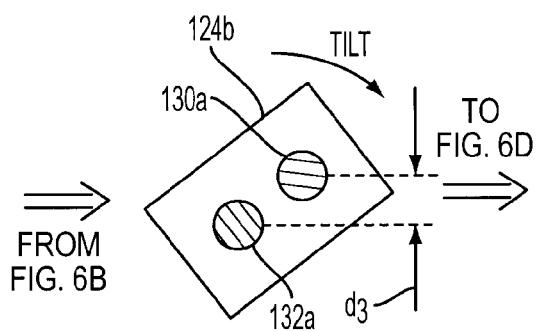

FIG. 6A illustrates another embodiment of the present invention where tracking and trigger indicators 130a and 132a are provided. In this example, the track/trigger indicators 130a and 132a are provided so that determinations can be made of the relative distances between the two indicators as shown by distance ($d_1$). In one example, the object, when pointed at the image capture device 105 may respond by having the computer program that is executed on the computer 102 to ascertain the distance $d_1$ and perform an interactive action on the display screen. When the object 124b is tilted relative to the starting position of FIG. 6B, a second distance ($d_2$) is computed. This distance is the new distance between the track/trigger indicators 130a and 132a. As the user continues to tilt the object 124b as shown in FIG. 6C, the distance continues to shrink as shown by distance ($d_3$). Once the object 124b has been placed in the horizontal position relative to the vertical position of FIG. 6A, the distance between the track and trigger indicators 130a and 132a is brought to approximately zero. At this point, the program may read that the user intends for a trigger action to occur, or any other action that can be triggered when the detected distance from $d_1$ to $d_4$ has been detected.

Figure 6D:
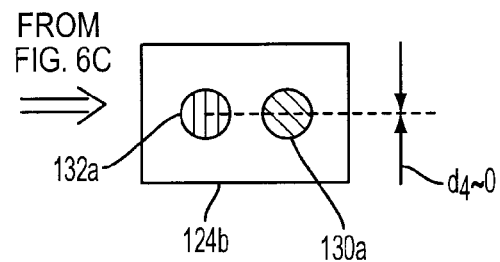

In another embodiment, the response by the computer program may be gradually changed, depending on the angle at which the detection region 124b is tilted. For instance, the user may immediately begin to shoot the gun (or trigger the shooting of the gun) when the tilting begins and is executed between the tilt of FIG. 6B to the tilt of FIG. 6D. When the user tilts the gun back to the original position, the gun may discontinue the shooting activity. Consequently, the trigger activity caused by analyzing the patterns or colors of the tracking and trigger indicators of 130a and 132b can cause the computer program to react in different interactive ways.

An example of this interactivity may be to trigger a reloading operation to occur for a gun that is being used in a video game, or a change of gun type being used on the video game program. Once these changes are processed, the video display screen 110 will produce a different graphical animation for the user, depending upon the control being provided and detected by the image capture device.

Commands and trigger states are not limited to an ON and OFF parameters, but can be incrementally changed depending on the position of the relative state and angles of the trigger and track indicators. For example, the state of the trigger may be determined in a linear or variable state as opposed to ON or OFF. Any known technique can be used to determine the relative trigger position including a resistive types used to control acceleration in remote control race tracks. The device, or gun in this example, can communicate the state of its trigger by encoding and transmitting its value in any of a multitude of ways known in the art. A variety of commands and gestures may be formulated based on the state of the trigger and the position of the device, including those based on all known machine recognizable gestures, which are now hereunder embodied in the present invention with a variable state indicator to establish an additional index of user control to the device under control.

Figure 6E:
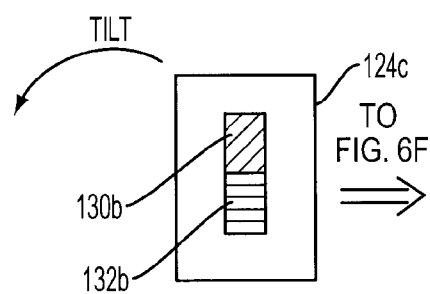
Figure 6F:
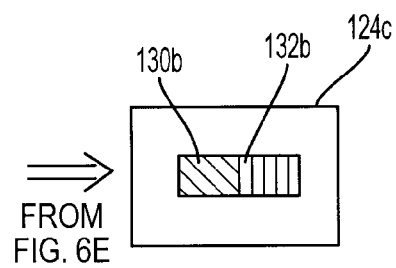

FIGS. 6E and 6F provide yet another embodiment where different colors may be used to track tilt or relative tilt between positions of the detection regions 124c. In this example, the track and trigger indicators 130b and 132b are square or rectangular in dimension and can be defined by colored tapes, bar codes, light indicators, LEDs, or the like. As a user flips or tilts the detection region 124c from the position of FIG. 6E to FIG. 6F, for example, the reaction by the computer game as displayed on the computer display screen will change.

FIG. 7 illustrates another embodiment of the present invention in which a hand 122 is used to control the interactivity on the display screen. The user may position his wrist 144 to place the hand 122 in front of the image capture device 105 and it is tracked relative to the head of the person 112. In this example, the user's hand is extended having an index finger 140 pointing at the display screen 110. The user's thumb 142 may be pointing upright to indicate to the computer program executing on the computer 102 that the trigger device has not been activated. When the user's thumb 142 is moved down toward the index finger 140 in the direction 122a, the computer program executing on a computer 102 may detect from the captured digital image that the user intends to shoot or trigger or interactively point to a specific region on the display screen 110. Thus, the user's hand being placed in a different position can trigger an event or cause the interactivity of a command with a computer program being executed and shown on the display screen 110. For example, the user may be able to shoot by different hand gestures, may be able to reload the gun with different gestures, and the different positions or orientations of the user's hand may cause different graphical renderings of the user or gun on the display screen when the user is interacting with a particular game program. In this embodiment, the state of the trigger may be determined ON or OFF as described above, or, the trigger may be determined in a variable state. In the latter, the relative position of the user's thumb may range from, for example, the position in which the thumb is substantially perpendicular to the pointing finger and the position where the thumb is substantially parallel to the pointing finger and where the system performs image analysis of the hand to yield a relative state of the thumb. This state may be mapped to various control schemes, including those relating to a scroll-wheel on mouse.

FIGS. 8A and 8B illustrate another example where the user's hand 122 may be used to identify or trigger different activity on the display screen. In this example, FIG. 8A shows the user pointing directly at the display screen 110 and the computer program being executed to identify this hand orientation on the digital image that was captured by the capture device. When a subsequent capture period occurs at a different point in time, the image of FIG. 8B might be captured and analyzed by the computer program. In this example, the user's hand is shown tilted from where the thumb 142 is pointing upright to where the thumb 142 is pointing sideways. In this orientation, the user may be able to trigger the shooting of a gun on the display screen, or the selection of an icon on a graphical display.

Consequently, the detection of the user's hand and the orientation of the user's hand can be used to provide the interactivity necessary when analyzing the position of the user's hand relative to the user's head, and the pointing activity on a display screen. The pointing activity will allow the user to control the device under operation, select icons, shoot at graphical objects, select or scroll graphical objects, de-select graphical objects, turn ON and OFF graphical objects, disperse graphical objects, or simply interface with the graphics icons and features of a computer program being displayed on a display screen 110. However, in certain configurations, it may be desirable, that the system employing the present invention may operate with minimal or no icons on a display screen. Instead, the system may simply just recognize the gestures of the user and provide a control input to the device under operation. For example, a television or related peripheral configured or integrated with the present invention may be controlled by the present invention. Changing a channel, for example, may not necessarily involve interacting with an icon as opposed to recognizing a gesture command according to the scheme presented in the present invention.

Figure 9:
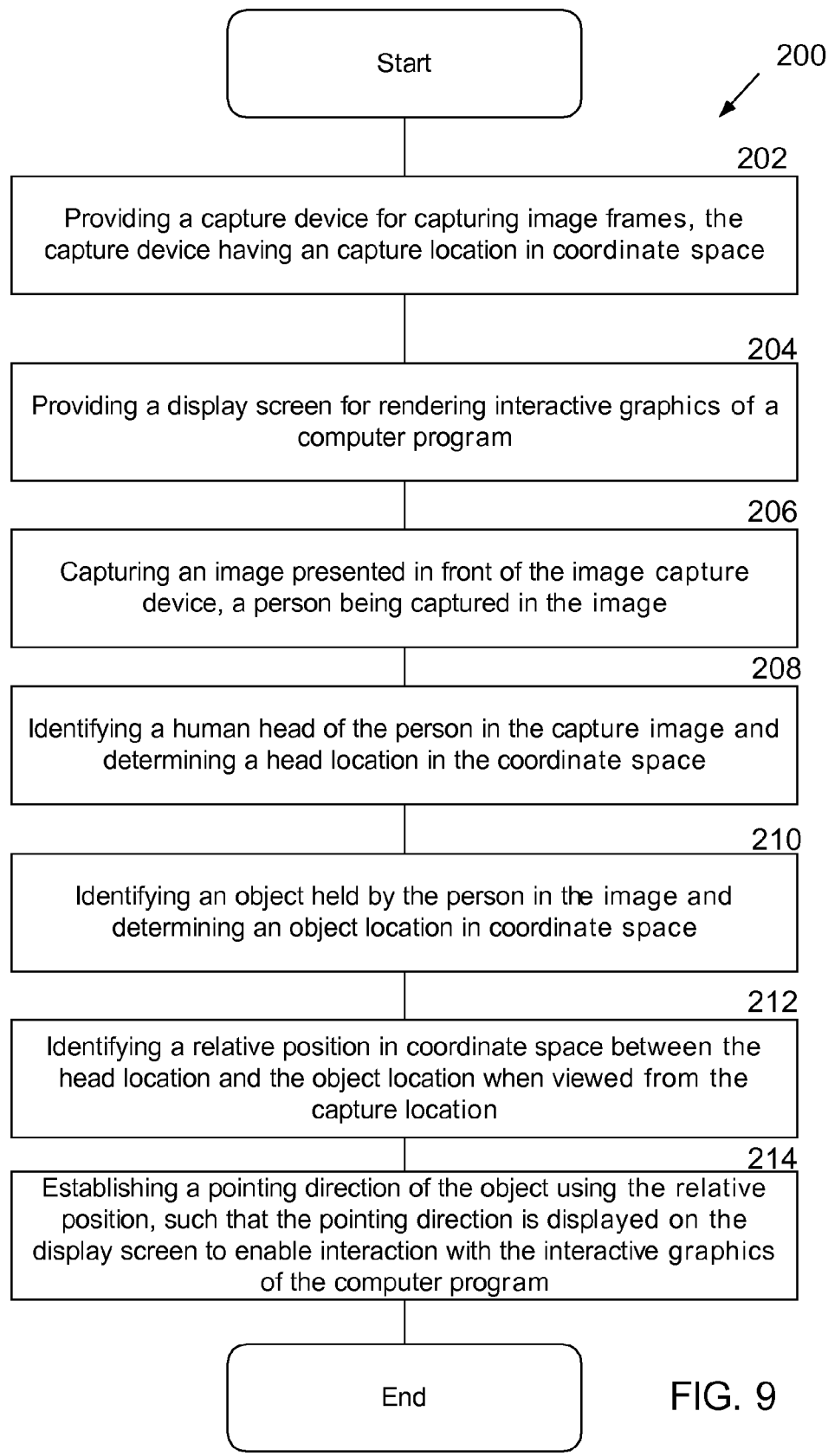
FIGS. 9 and 10 provide exemplary flow charts of the operations that can be executed in determining a pointing direction, in accordance with one embodiment of the present invention.

FIG. 9 illustrates a flowchart diagram 200 where a process for identifying a pointing direction is described, in accordance with one embodiment of the present invention. In operation 202, the method begins by providing a capture device for capturing image frames. The frame capture rate will depend on the particular implementation, and will not limit the invention described herein. The capture device will, in one embodiment, include a capture location in coordinate space. As shown in FIG. 4, the coordinate space of the image capture device is (0, 0, 0). In operation 204, a display screen is provided for rendering and displaying the interactive graphics of a computer program.

The interactive graphics of the computer program may be associated with a computer game, but may also be associated with any other program or interface that may require interactivity by a user. For instance, the interactivity may include the selection or de-selection of objects, opening files, changing channels, recording TV shows, closing files, accessing files over a network, or interactively communicating with users by way of the internet, electronic mail or by electronic video mail, selecting a consumer electronic device, turning a device ON or OFF. Next, the operation 206 will include the capturing of an image that is presented in substantially in front of the image capture device. In one embodiment, the image will include a person that is part of the captured space, and who is in front of the display screen and the capture device.

Once the image has been captured in operation 206, operation 208 will include the identification of a human head of the person that is found in the captured image. The identified human head will therefore be analyzed to ascertain the head location in the coordinate space relative to the capture location. The method then moves to operation 210 where an object held by the person in the image is identified. The object's location is identified such that the coordinate space of the object is identified relative to the coordinate space of the capture location. Having the identified head location and the identified object location in memory, at operation 212 the computer program can identify a relative position in coordinate space between the head location and the object location when viewed from the capture location reference point (e.g., coordinate (0,0,0)). As mentioned above, an azimuth angle and an altitude angle can be computed for the relative locations of the head and the hand relative to the image capture device. This relative position in coordinate space is calculated for the captured frame. As will be discussed below, the relative position in coordinate space may include a dimension of depth relative to the capture location reference point. Such dimension of depth may be determined using stereoscopic imaging or sound location techniques as discussed in detail below or a combination of such techniques.

In operation 214, a pointing direction is established for the object using the relative position identified between the object location and the head location. The pointing direction is displayed on the display screen to enable interaction with the interactive graphics provided by the computer program and displayed on the display screen.

Figure 10:
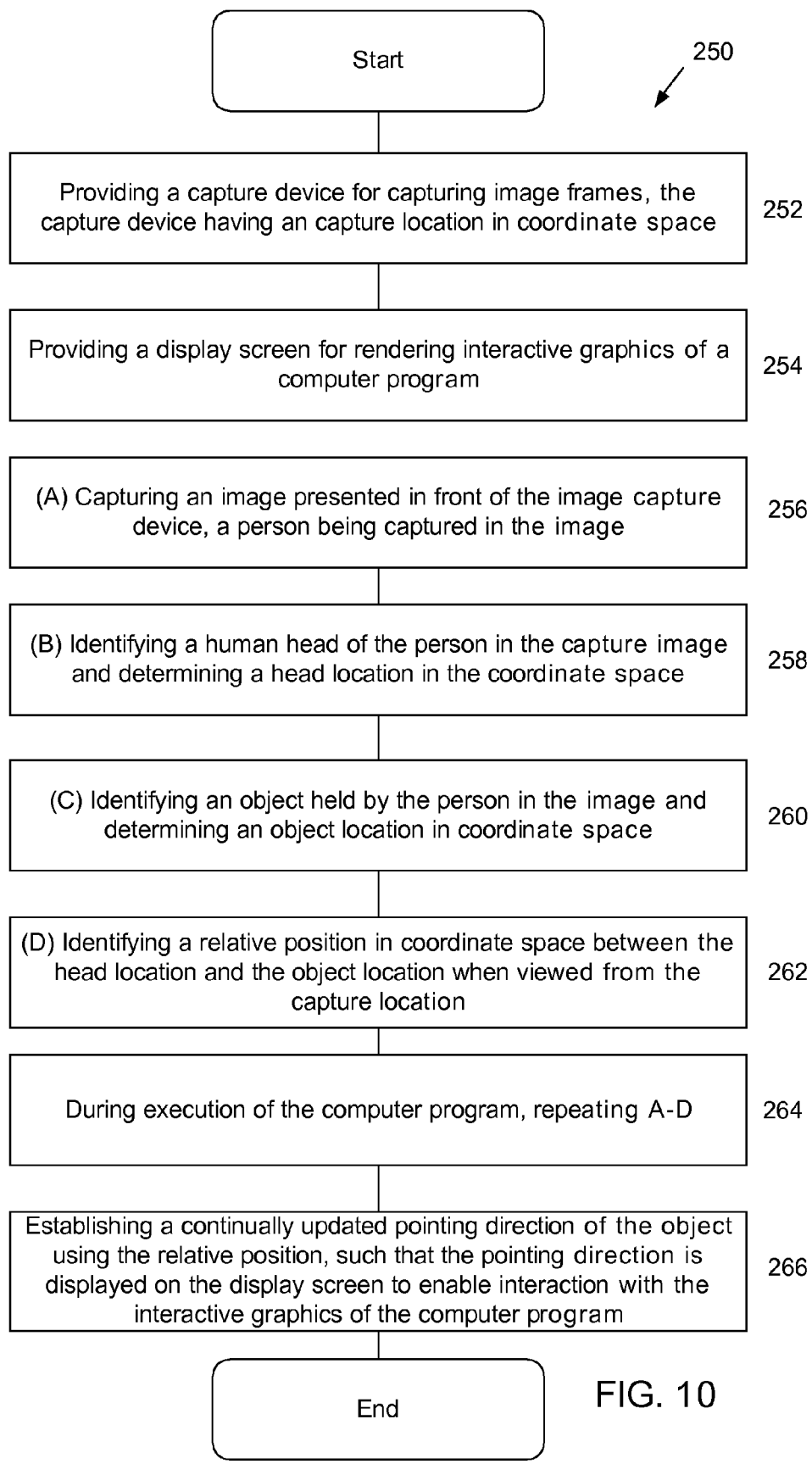

FIG. 10 illustrates a more detailed process diagram 250 that can be implemented when determining the pointing direction of an object that is directionally pointed at a display screen during an interactivity with a computer program. The method begins at operation 252 where the capture device for capturing image frames is provided. The capture device will have a capture location in coordinate space. The coordinate space of the capture location will be the reference point for performing operations to determine relative locations in the process of identifying directionality pointing.

The method moves to operation 254 where a display screen is provided for rendering interactive graphics of the computer program. The interactive graphics may be a computer game or may be any other program as defined above. In operation 256, an image is captured in front of the image capture device and a person is captured in the image. The captured image may be that of a digital frame of video. In one embodiment, the digital frame of video may be a JPEG frame or may be part of a compressed video frame (e.g., MPEG or the like).

Next, the operation moves to the identification of a human head of the person in the captured image in operation 258. The human head is analyzed on the captured image to determine a head location and the coordinate space relative to the image capture device. In operation 260, the method moves to the identification of an object held by the person in the image and determining an object location in the coordinate space. In operation 262, a relative position is identified in the coordinate space between the head location and the object location when viewed from the capture location of the capture device. The relative position will include a calculation of an azimuth angle and an altitude angle relative to the image capture device. As will be discussed below, the object location in coordinate space may include a dimension of depth relative to the capture location reference point. Such dimension of depth may be determined using stereoscopic imaging or sound location techniques as discussed in detail below or a combination of such techniques.

In operation 264, during execution of the computer program, the operations identified as A, B, C and D corresponding to operations 256, 258, 260, and 262 will be performed iteratively and continuously, depending on a rate desired for the performance of a computer program. For instance, the execution of operations A through D will occur at the rate of one time for each frame that is captured or only after a certain number of frames are captured. The rate at which operations A through D are performed will therefore depend on the specific environment and the need for accurate detection of the pointer location and the select ability of interactive objects on the display screen. If the display screen is processing a video game that has objects that are moving at rapid rates, the tracking operation may require that operations A through D be performed for each frame that is displayed on the video display screen.

In operation 266, the method indicates a continual update of the point and direction of the object using the relative position. The pointing direction is displayed on the display screen to enable interaction with the interactive graphics of the computer program. It should again be understood that the pointing direction can be to enable a user to select icons, de-select icons, move icons, open objects, open files, save files, move files, and interact with files that may be part of a file database, or part of a graphical user interface on a computer desktop or the like.

Figure 11:
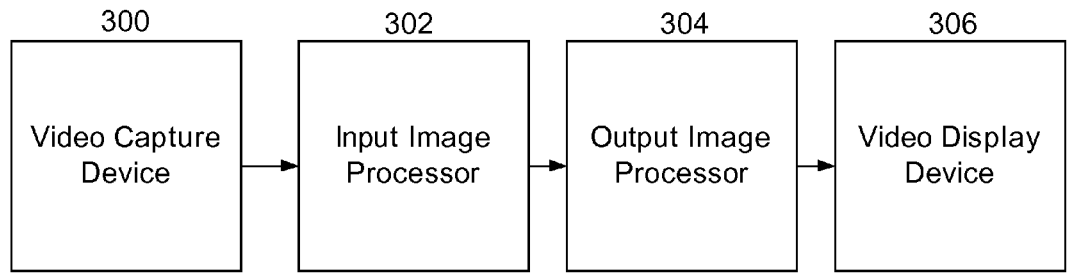
FIGS. 11 and 12 provide exemplary embodiments of hardware that may be used in processing the computer code necessary to execute the claimed operations, in accordance with one embodiment of the present invention.

FIG. 11 is a block diagram of an exemplary user input system for interaction with an object on a graphical display that can be used to implement embodiments of the present invention. As shown in FIG. 11, the user input system is comprised of a video capture device 300, an input image processor 302, an output image processor 304, and a video display device 306. Video capture device 300 may be any device capable of capturing sequences of video images, and, in one embodiment, is a digital video camera (such as a "web-cam"), or similar image capturing device. As mentioned above, the video capture device may be configured to provide depth image. Input image processor 302 translates the captured video images of the control object into signals that are delivered to an output image processor. In one embodiment, input image processor 302 is programmed to isolate the control object from the background in the captured video image through the depth information and generate an output signal responsive to the position and/or movement of the control object. The output image processor 304 is programmed to effect translational and/or rotational movement of an object on the video display device 306 in response to signals received from the input image processor 302.

These and additional aspects of the present invention may be implemented by one or more processors which execute software instructions. According to one embodiment of the present invention, a single processor executes both input image processing and output image processing. However, as shown in the figures and for ease of description, the processing operations are shown as being divided between an input image processor 302 and an output image processor 304. It should be noted that the invention is in no way to be interpreted as limited to any special processor configuration, such as more than one processor. The multiple processing blocks shown in FIG. 11 are shown only for convenience of description.

Figure 12:
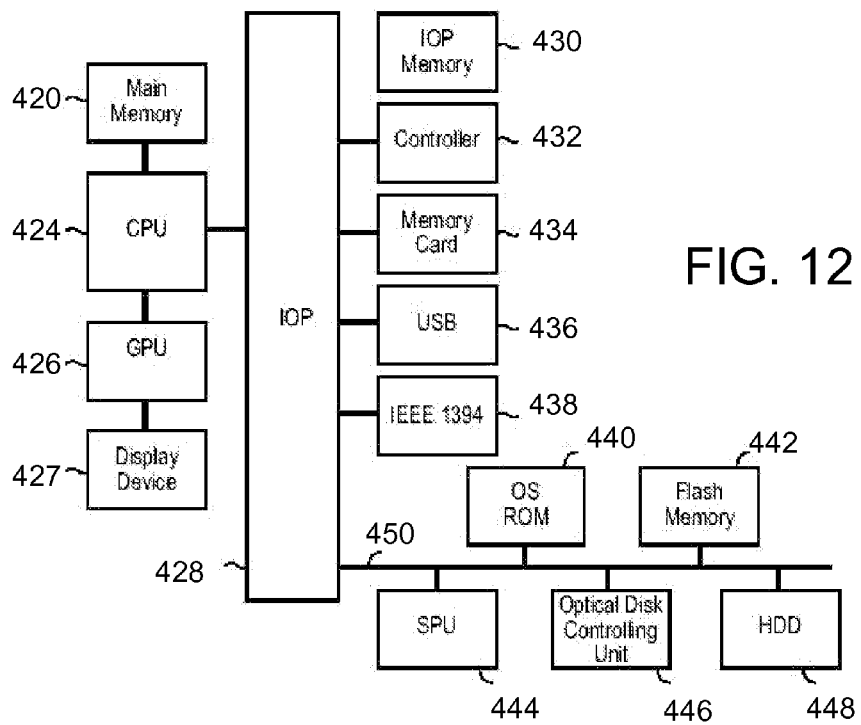

FIG. 12 is a simplified block diagram of a computer processing system configured to implement the embodiments of the invention described herein. The processing system may represent a computer-based entertainment system embodiment that includes central processing unit ("CPU") 424 coupled to main memory 420 and graphical processing unit ("GPU") 426. CPU 424 is also coupled to Input/Output Processor ("IOP") Bus 428. In one embodiment, GPU 426 includes an internal buffer for fast processing of pixel based graphical data. Additionally, GPU 426 can include an output processing portion or functionality to convert the image data processed into standard television signals, for example NTSC or PAL, for transmission to display device 427 connected external to the entertainment system or elements thereof. Alternatively, data output signals can be provided to a display device other than a television monitor, such as a computer monitor, LCD (Liquid Crystal Display) device, or other type of display device.

IOP bus 428 couples CPU 424 to various input/output devices and other busses or device. IOP bus 428 is connected to input/output processor memory 430, controller 432, memory card 434, Universal Serial Bus (USB) port 436, IEEE1394 (also known as a Firewire interface) port 438, and bus 450. Bus 450 couples several other system components to CPU 424, including operating system ("OS") ROM 440, flash memory 442, sound processing unit ("SPU") 444, optical disc controlling unit 446, and hard disk drive ("HDD") 448. In one aspect of this embodiment, the video capture device can be directly connected to IOP bus 428 for transmission therethrough to CPU 424; where, data from the video capture device can be used to change or update the values used to generate the graphics images in GPU 426. Moreover, embodiments of the present invention can use a variety of image processing configurations and techniques, such as those described in U.S. patent application Ser. No. 10/365,120 filed Feb. 11, 2003, and entitled METHOD AND APPARATUS FOR REAL TIME MOTION CAPTURE, which is hereby incorporated by reference in its entirety. The computer processing system may run on a CELL™ processor.

Programs or computer instructions embodying aspects of the present invention can be provided by several different methods. For example, the user input method for interaction with graphical images can be provided in the form of a program stored in HDD 448, flash memory 442, OS ROM 440, or on memory card 432. Alternatively, the program can be downloaded to the processing unit through one or more input ports coupled to CPU 424. The program modules defining the input method can be provided with the game or application program that is executed by CPU 424 and displayed on display device 427 or they may be provided separately from the application program, such as for execution from local main memory 420.

In still another embodiment, the program may be executed partially on a server connected to the internet and partially on the local computer (e.g., game console, desktop, laptop, or wireless hand held device). Still further, the execution can be entirely on a remote server or processing machine, which provides the execution results to the local display screen. In this case, the local display or system should have minimal processing capabilities to receive the data over the network (e.g., like the Internet) and render the graphical data on the screen. The user's input, by way of the capture device can be communicated back to the server and then the response represented on the screen.

Figure 13A:
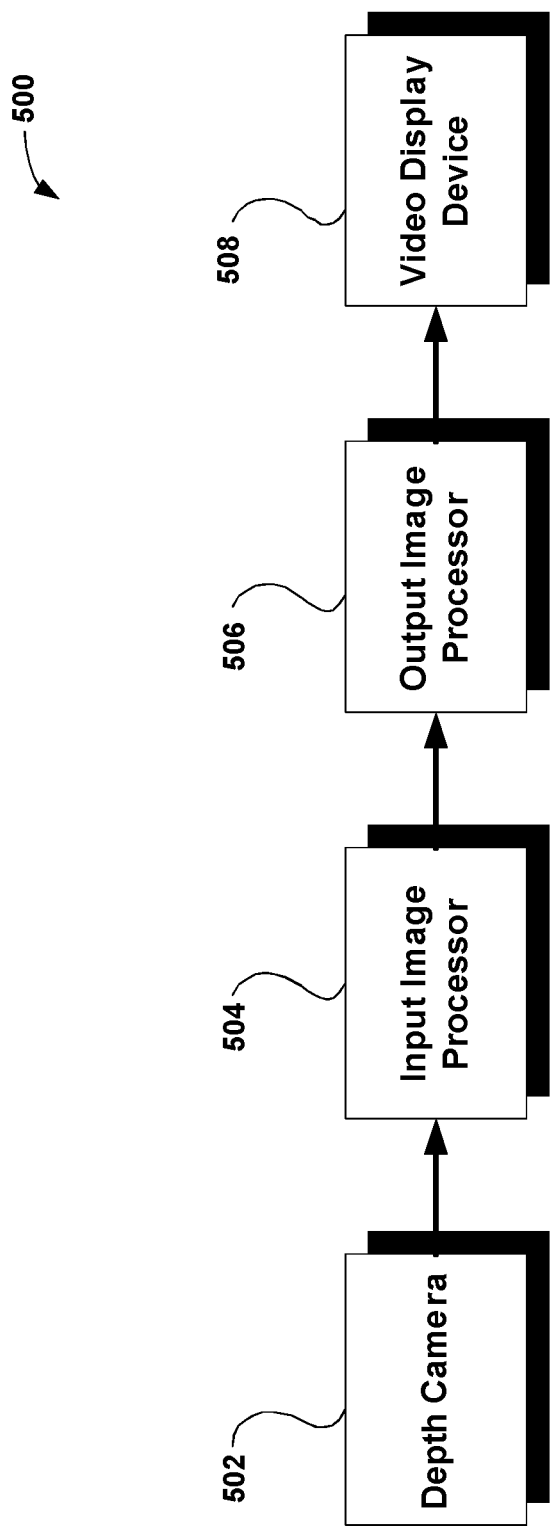
FIGS. 13A-13C illustrate embodiments for when depth information is considered when identifying objects to track, when interfacing with a system that needs to ascertain pointing direction, in accordance with one embodiment of the present invention.
Figure 13B:
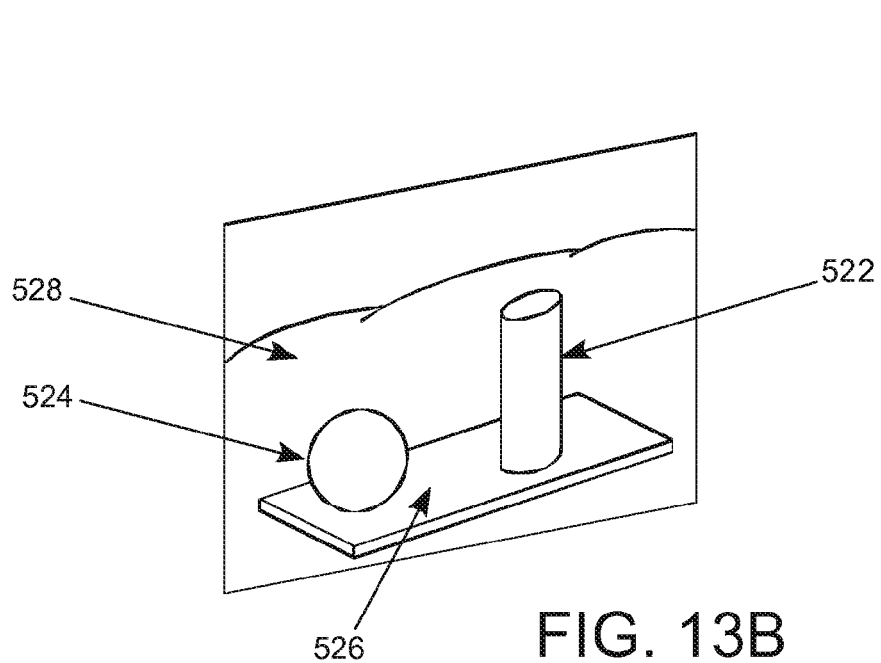
Figure 13C:
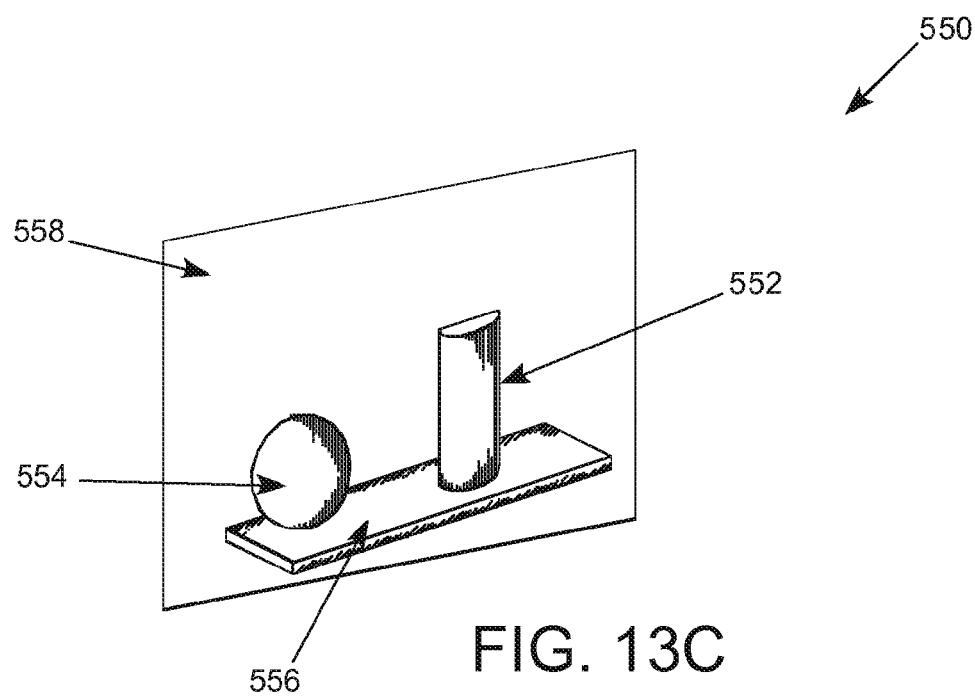

FIGS. 13A-13C illustrate embodiments where depth data is taken into consideration in order to better identify the object used to perform the directional pointing. The object can be something the person is holding or can also be the person's hand. In this description, the terms "depth camera" and "three-dimensional camera" refer to any camera that is capable of obtaining distance or depth information as well as two-dimensional pixel information. For example, a depth camera can utilize controlled infrared lighting to obtain distance information. Another exemplary depth camera can be a stereo camera pair, which triangulates distance information using two standard cameras. Similarly, the term "depth sensing device" refers to any type of device that is capable of obtaining distance information as well as two-dimensional pixel information.

Recent advances in three-dimensional imagery have opened the door for increased possibilities in real-time interactive computer animation. In particular, new "depth cameras" provide the ability to capture and map the third-dimension in addition to normal two-dimensional video imagery. With the new depth data, embodiments of the present invention allow the placement of computer-generated objects in various positions within a video scene in real-time, including behind other objects.

Moreover, embodiments of the present invention provide real-time interactive gaming experiences for users. For example, users can interact with various computer-generated objects in real-time. Furthermore, video scenes can be altered in real-time to enhance the user's game experience. For example, computer generated costumes can be inserted over the user's clothing, and computer generated light sources can be utilized to project virtual shadows within a video scene. Hence, using the embodiments of the present invention and a depth camera, users can experience an interactive game environment within their own living room.

FIG. 13A is a block diagram of an exemplary system 500 for providing a real-time three-dimensional interactive environment, in accordance with an embodiment of the present invention. As shown in FIG. 13A, the system 500 includes a depth camera 502, an input image processor 504, an output image processor 506, and a video display device 508.

As mentioned above, the depth camera 502 provides the ability to capture and map the third-dimension in addition to normal two-dimensional video imagery. FIGS. 13B and 13C illustrated the images generated by a typical depth camera 502. In particular, FIG. 13B is an illustration showing two-dimensional data 520 captured using a typical depth camera. Similar to normal cameras, a depth camera captures two-dimensional data for a plurality of pixels that comprise the video image. These values are color values for the pixels, generally red, green, and blue (RGB) values for each pixel. In this manner, objects captured by the camera appear as two-dimension objects on a monitor. For example, in FIG. 13B, the exemplary scene includes a cylinder object 522 and a sphere object 524 disposed on a table 526, which may be situated among hills 528.

However, unlike a conventional camera, a depth camera also captures depth values for the scene. FIG. 13C is an illustration showing depth data 550 captured using a typical depth camera. As illustrated in FIG. 13B, the depth camera captures the x and y components of a scene using RGB values for each pixel in the scene. However, as shown in FIG. 13C, the depth camera also captures the z-components of the scene, which represent the depth values for the scene. Since the depth values correspond to the z-axis, the depth values are often referred to as z-values.

In operation, a z-value is captured for each pixel of the scene. Each z-value represents a distance from the camera to a particular object in the scene corresponding to the related pixel. For example, in FIG. 13C, z-values are illustrated for the cylinder object 552, the sphere object 554, and part of the table 556. In addition, a maximum detection range is defined beyond which depth values will not be detected. For example, in FIG. 13C the maximum depth range 558 appears as vertical plane wherein all pixels are given the same depth value. As will be described in greater detail below, this maximum range plane can be utilized by the embodiments of the present invention to provide user defined object tracking. Thus, using a depth camera, each object can be tracked in three dimensions. As a result, a computer system of the embodiments of the present invention can utilize the z-values, along with the two-dimensional pixel data, to create an enhanced three-dimensional interactive environment for the user. For more information on depth analysis, reference may be made to U.S. patent application Ser. No. 10/448,614, entitled System and Method for Providing a Real-time three dimensional interactive environment, having a filing date of May 29, 2003, which is incorporated herein by reference.

Figure 14A:
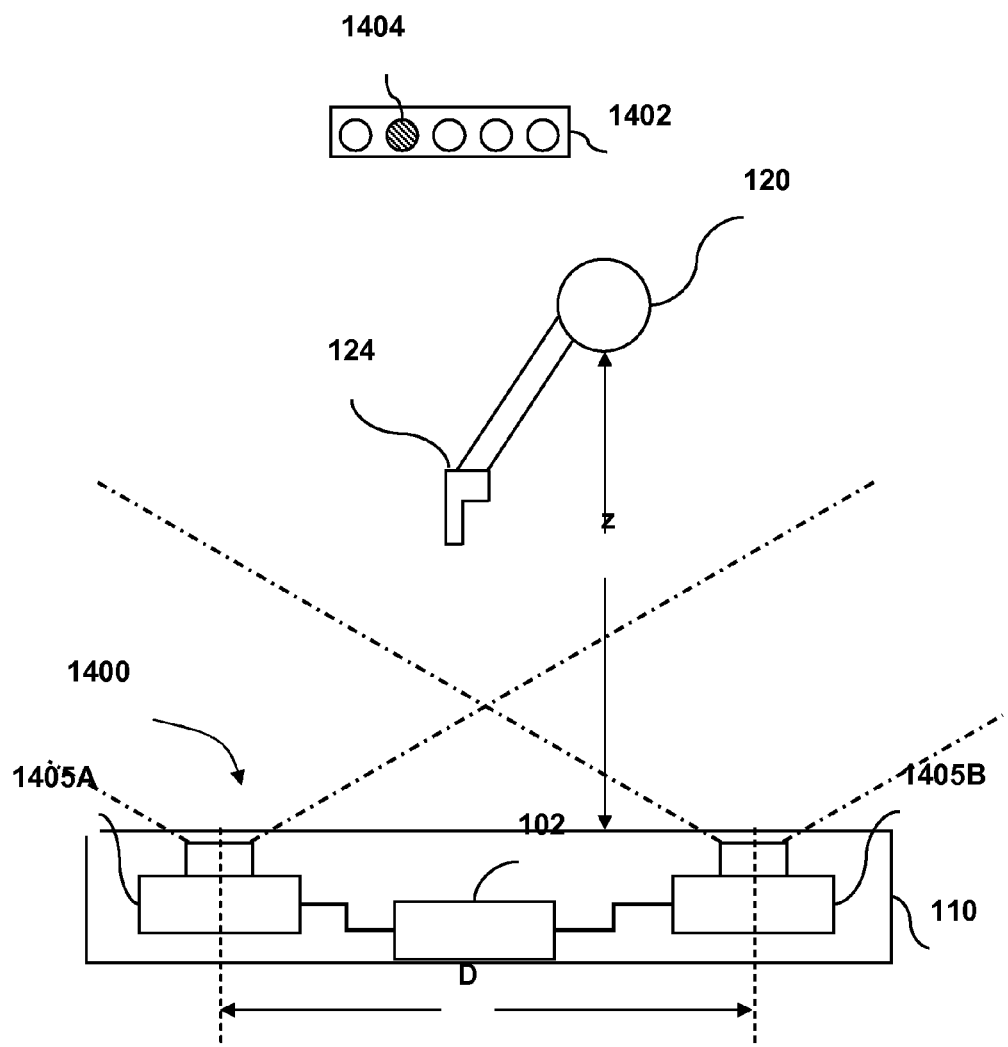
FIGS. 14A-14C illustrate an embodiment of the invention wherein stereoscopic techniques are used to determine an object's depth.
Figure 14B:
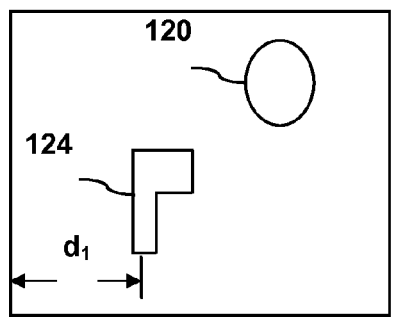
Figure 14C:
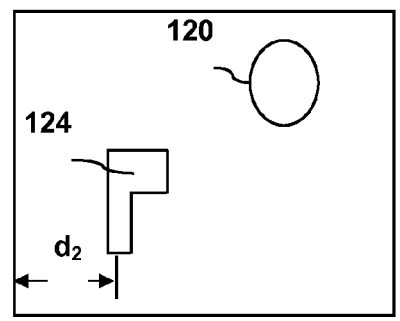

According to an embodiment of the invention, the depth camera 502 may also be a stereo eye camera as depicted in FIGS. 14A-14C. For example, an interactive game setup 1400 may include a first camera 1405A and a second camera 1405B separated from each other by a known distance D. The cameras may be mounted to the top of the display screen 110 and operably connected to the computer 102, e.g., by cables or wireless media. Each camera 105A, 105B has a field of view, the boundaries of which are indicated by the dashed lines in FIG. 14A. The optical axes of the two cameras may be oriented parallel to each other. Since the field of view for each camera is slightly different, they will produce slightly different images of the object 124 and/or the head 120. These differing views may be used to determine the depth z of objects relative to a plane containing the two cameras 1405A, 1405B.

The addition of an ability to measure depth allows the interactive game setup 100 to determine relative distances, e.g., between the head 120 and object 124. Such capability is also useful, e.g., in situations where the relative positions of the head 120 and object 124 are significant to the game. For example, where the object 124 is a gun, the angle of the gun may be determined from the motion of the head 120 and the gun. Alternatively, moving the gun back toward the head 120 may act as a trigger to the game program to reload the gun.

By way of example, as shown in FIG. 14B, when the first camera 1405A produces an image of the head 120 and object 124, the object 124 may appear at a distance $d_1$ from an edge of the field of view of the first camera 1405A. Similarly, when the second camera 1405B produces an image of the head 120 and object 124, the object 124 may appear at a distance $d_2$ from an edge of the field of view of the second camera 1405B. The two distances $d_1$, $d_2$ may be used to determine a depth z, e.g., using triangulation.

By way of example, and without limitation of the invention, the first and second cameras 1405A, 1405B may be can be as simple as a standard web cam or can include more advanced technology. In one embodiment, the cameras 1405A, 1405B are capable of capturing images, digitizing the images, and communicating the image data back to the computer 102. Each camera 1405A, 1405B may be capable of capturing images at a frame rate of about 120 frames per second. Each camera may have a field of view of about 75 degrees, and an f-stop of about 1.5.

By way of example and without limitation, the 1405A, 1045B may be color digital cameras that use computer vision to process images taken by the camera. Such cameras allow players to interact with games using motion, color detection and also, through built-in microphone, sound. In a particular embodiment, the cameras 1405A, 1405B are a pair of EyeToy Cameras available for Logitech of Fremont, Calif. The cameras 1405A, 1405B may have logic integrated therein for performing the digitizing. Alternatively, the cameras 1405A, 1405B may simply transmit the captured data back to the computer 102 for digitizing. In either case, the cameras 1405A, 1405B may be capable of capturing either color or black and white images of any object located in front of them.

It is often desirable to synchronize the timing of images from the two cameras 1405A, 1405B. There are a number of different schemes for doing so. For example, the cameras may be run using a common oscillator to synchronize their respective electronics. Alternatively, a strobe tower, 1402 may be used to synchronize two cameras having independent oscillators. The strobe tower 1402 is placed in the field of view of both cameras 1405A, 1405B. The strobe tower includes an array of strobe signal generators, e.g., light emitting diodes (LEDs) 1404 that flash in a known sequence. For example each LED beginning with the LED on the left may flash a short period of time Δt after the previous LED has flashed. By way of example, the Δt may be set equal to twice the time step between video image frames for the system 1400. Since each camera 1405A, 1405B can "see" the strobe tower 1402, images may be synchronized between the two cameras based on which LED 1404 is lit in the image.

In other embodiments, the strobe tower 1402 may include one or more LEDs that emit a light signal having a frequency that varies with respect to time. In such a case, synchronization of images may be obtained from the frequency (or color) of the signal from the strobe tower 1402.

Use of a strobe tower 1402 also allows interpolation between images taken at different known times. For example, given two different positions of the object 124 determined at two different known times, it is possible to determine a velocity of the object 124 from the change in position and the time between images.

Certain embodiments of the invention may use sound to determine the positions of objects. For example, FIGS. 15A-15B depict an image capture device 1500 that may be used with an interactive game setup of the type described above. The device 1500 includes an optical image capture device 1505, e.g., a digital camera of any of the types described above and an array of microphones 1502 that are spaced apart from each other at known distances. For example, the microphones 1502 may be spaced in a linear array with adjacent microphones spaced about 2 centimeters apart center-to-center. Each microphone may have a resonant frequency of about 48 kilohertz.

In certain embodiments of the invention it is desirable for the microphones 1502 to move with the image capture device 1505. For example, the microphones 1502 may be mounted to a frame 1504 that keeps the microphones in a fixed positional relationship with respect to the image capture device, e.g., with respect to a lens 1506. Although the microphones are depicted as being arrayed in a horizontal linear arrangement, they may alternatively be oriented vertically or diagonally or arrayed in a two-dimensional arrangement.

The microphones 1502 may be coupled to the computer 102 or the device 1500 may include logic for interpreting audio signals received by the microphones 1502. The object 124 used in the video game (e.g., a gun) may include a sound emitter 1503. When the sound emitter 1503 produces a sound the resulting sound waves arrive at the microphones at different times depending on the location of the object 124. The different arrival times may be used to determine a position of the object. The sound emitter may also serve as an audio trigger signal to the computer 102.

Each image capture device may be a digital camera as described above. Such a camera may have a field of view of about 75 degrees, and an f-stop of about 1.5 and be capable of capturing images at a frame rate of up to about 120 frames per second.

In some embodiments, the device 1500 may include a visible LED 1508 and an infrared LED 1510. These may be used to illuminate objects in a field of view of the image capture device 1505. To facilitate capture of infrared images, the lens 1506 may include a so-called "day-night" coating that transmits visible light and selected frequencies of the infrared (e.g., frequencies at around 940 nm).

In certain embodiments, two image capture devices 1500A, 1500B of the type shown in FIGS. 15A-15B may be used in stereo as shown in FIG. 15C in an interactive game setup 1550, which may include a strobe tower 1402 as described above. Although two image capture devices 1500A, 1500B are depicted, a single device may alternatively be used and depth information may be determined using the microphones 1502 in conjunction with visual information from the single device.

Embodiments of the present invention also contemplate distributed image processing configurations. For example, the invention is not limited to the captured image and display image processing taking place in one or even two locations, such as in the CPU or in the CPU and one other element. For example, the input image processing can just as readily take place in an associated CPU, processor or device that can perform processing; essentially all of image processing can be distributed throughout the interconnected system. Thus, the present invention is not limited to any specific image processing hardware circuitry and/or software. The embodiments described herein are also not limited to any specific combination of general hardware circuitry and/or software, nor to any particular source for the instructions executed by processing components.

With the above embodiments in mind, it should be understood that the invention may employ various computer-implemented operations involving data stored in computer systems. These operations include operations requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

The above described invention may be practiced with other computer system configurations including hand-held devices, microprocessor systems, microprocessor-based or programmable consumer electronics, minicomputers, mainframe computers and the like. The invention may also be practiced in distributing computing environments where tasks are performed by remote processing devices that are linked through a communications network.

The invention can also be embodied as computer readable code on a computer readable medium. The computer readable medium is any data storage device that can store data which can be thereafter read by a computer system, including an electromagnetic wave carrier. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A computer-implemented method for detecting depth and direction when interfacing with a computer program, comprising:
   (a) capturing one or more images with one or more depth camera that utilizes controlled lighting to obtain distance information, wherein the one or more depth camera has a capture location in a coordinate space;
   (b) identifying a first object in the image and assigning the first object a first object location in the coordinate space;
   (c) identifying a second object in the image and assigning the second object a second object location in coordinate space;
   (d) identifying a relative position in coordinate space between the first object location and the second object location when viewed from the capture location, wherein identifying the relative position includes computing an azimuth angle and an altitude angle between the first object location and the second object location in relation to the capture location, wherein the relative position includes a dimension of depth with respect to the coordinate space, wherein the dimension of depth is determined from analysis of the one or more images; and
   (e) changing a state of the program based on the relative position.

2. The method of claim 1 wherein the relative position defines a pointing direction of the first or second object.

3. The method of claim 1 wherein (a) includes capturing two or more images with first and second image capture devices and wherein the dimension of depth is determined by taking first and second images with first and second image capture devices located at spaced-apart positions and measuring distances of an object in each image relative to a reference in each of the first and second images.

4. The method of claim 3, further comprising synchronizing the first and second image capture devices using a strobe signal that is visible to each of the tow or more image capture devices.

5. The method of claim 1, wherein the capture location is at a proximate location of a display screen and the display screen is capable of rendering interactive graphics.

6. The method of claim 1, wherein the relative position in coordinate space is determined from relative times of arrival of a sound signal from the first or second at object at two or more different microphones.

7. The method of claim 1 wherein the relative position defines a pointing direction of the second body part when viewed by the image capture device at the capture location that is proximate to the display screen.

8. The method of claim 1, wherein the computer program is a video game.

9. The method of claim 1, wherein the one or more depth camera utilizes controlled infrared lighting to obtain distance information.

10. A system for detecting pointing direction of an object directed toward a display screen that can render graphics of a computer program, comprising:
   a processor;
   a memory coupled to the processor, the memory having embodied therein one or more computer executable instructions configured to implement, upon execution, a method for detecting depth and direction when interfacing with a computer program, the method comprising:
   (a) capturing one or more images with one or more depth camera that utilizes controlled lighting to obtain distance information, wherein the one or more depth camera has a capture location in a coordinate space;
   (b) identifying a first object in the image and assigning the first object a first object location in the coordinate space;
   (c) identifying a second object in the image and assigning the second object a second object location in coordinate space;
   (d) identifying a relative position in coordinate space between the first object location and the second object location when viewed from the capture location, wherein identifying the relative position includes computing an azimuth angle and an altitude angle between the first object location and the second object location in relation to the capture location, wherein the relative position includes a dimension of depth with respect to the coordinate space, wherein the dimension of depth is determined from analysis of the one or more images; and
   (e) changing a state of the program based on the relative position.

11. The system of claim 10, further comprising the one or more depth camera that utilizes controlled lighting to obtain distance information, wherein the one or more depth camera is coupled to the processor.

12. The system of claim 10, wherein the one or more depth camera utilizes controlled infrared lighting to obtain distance information.

13. A non-transitory computer-readable storage medium having embodied therein one or more computer executable instructions configured to implement, upon execution, a method for detecting depth and direction when interfacing with a computer program, the method comprising:
   (a) capturing one or more images with one or more depth camera that utilizes controlled lighting to obtain distance information, wherein the one or more depth camera has a capture location in a coordinate space;
   (b) identifying a first object in the image and assigning the first object a first object location in the coordinate space;
   (c) identifying a second object in the image and assigning the second object a second object location in coordinate space;
   (d) identifying a relative position in coordinate space between the first object location and the second object location when viewed from the capture location, wherein identifying the relative position includes computing an azimuth angle and an altitude angle between the first object location and the second object location in relation to the capture location, wherein the relative position includes a dimension of depth with respect to the coordinate space, wherein the dimension of depth is determined from analysis of the one or more images; and
   (e) changing a state of the program based on the relative position.

* * * * *